US008254419B1

(12) United States Patent
Savage-Leuchs et al.

(10) Patent No.: US 8,254,419 B1
(45) Date of Patent: Aug. 28, 2012

(54) APPARATUS AND METHOD TO SUPPRESS GAIN-SWITCHED SPIKES IN FIBER LASER AMPLIFIER SYSTEMS

(75) Inventors: Matthias P. Savage-Leuchs, Woodinville, WA (US); Lawrence A. Borschowa, Woodinville, WA (US); Eric C. Honea, Seattle, WA (US); Jason D. Henrie, Snohomish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/196,767

(22) Filed: Aug. 2, 2011

Related U.S. Application Data

(62) Division of application No. 12/715,308, filed on Mar. 1, 2010, now Pat. No. 7,991,027, which is a division of application No. 11/623,058, filed on Jan. 12, 2007, now Pat. No. 7,701,987, which is a division of application No. 11/488,910, filed on Jul. 17, 2006, now Pat. No. 7,539,231.

(60) Provisional application No. 60/699,894, filed on Jul. 15, 2005.

(51) Int. Cl.
H01S 3/30 (2006.01)
H01S 3/10 (2006.01)
H01S 3/13 (2006.01)

(52) U.S. Cl. .................. 372/25; 372/6; 372/30; 372/31

(58) Field of Classification Search ............... 372/6, 25, 372/29.014, 29.015, 31, 38.02, 38.07, 70, 372/30
See application file for complete search history.

(56) References Cited

U.S. PATENT DOCUMENTS

| 5,295,209 | A  | 3/1994  | Huber          |
|-----------|----|---------|----------------|
| 5,463,648 | A  | 10/1995 | Gibbs          |
| 5,604,759 | A  | 2/1997  | Miyaki et al.  |
| 5,790,722 | A  | 8/1998  | Minden et al.  |
| 5,991,070 | A  | 11/1999 | Zanoni et al.  |
| 6,208,672 | B1 | 3/2001  | Gunning et al. |
| 6,281,471 | B1 | 8/2001  | Smart          |
| 6,429,965 | B1 | 8/2002  | Falquier et al.|
| 6,693,660 | B2 | 2/2004  | Hemmings       |
| 6,876,818 | B1 | 4/2005  | Bai et al.     |
| 7,136,402 | B1 | 11/2006 | Ohtsuki        |
| 7,269,190 | B2 | 9/2007  | Park et al.    |
| 7,414,780 | B2 | 8/2008  | Fermann et al. |
| 7,692,852 | B2 | 4/2010  | Akasaka et al. |
| 7,738,514 | B2 | 6/2010  | Rogers et al.  |
| 2008/0105664 | A1 | 5/2008 | Smart        |

*Primary Examiner* — Armando Rodriguez

(74) *Attorney, Agent, or Firm* — Charles A. Lemaire; Jonathan M. Rixen; Lemaire Patent Law Firm, P.L.L.C.

(57) ABSTRACT

Apparatus and method for generating controlled-linewidth laser-seed-signals for high-powered fiber-laser amplifier systems. In some embodiments, the natural chirp (frequency change of laser light over a short start-up time) of a DBR laser diode when driven by pulsed current is used to broaden the linewidth of the laser output, while adjusting the peak current and/or the pulse duration to obtain the desired linewidth.

20 Claims, 23 Drawing Sheets

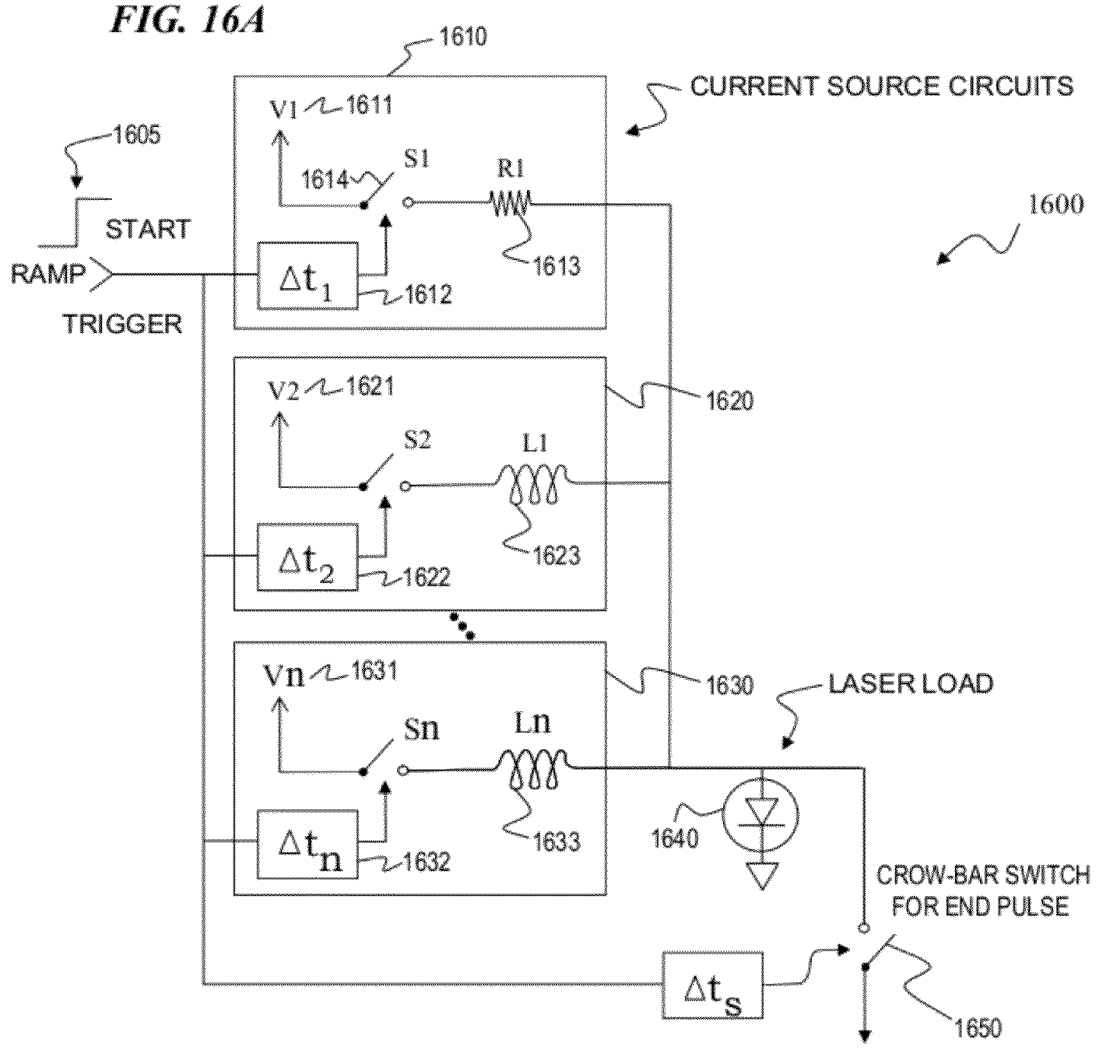

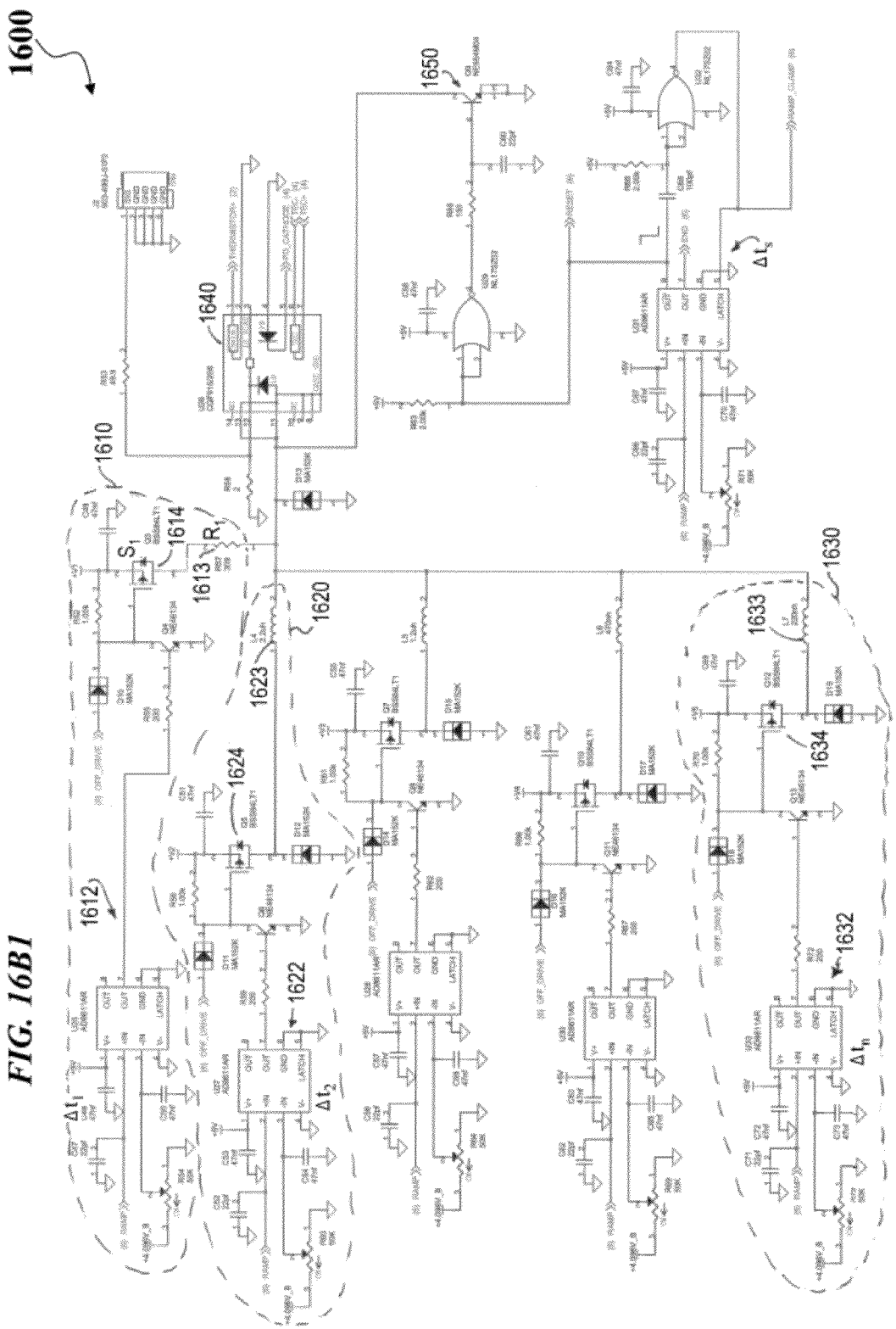
FIG. 16B1

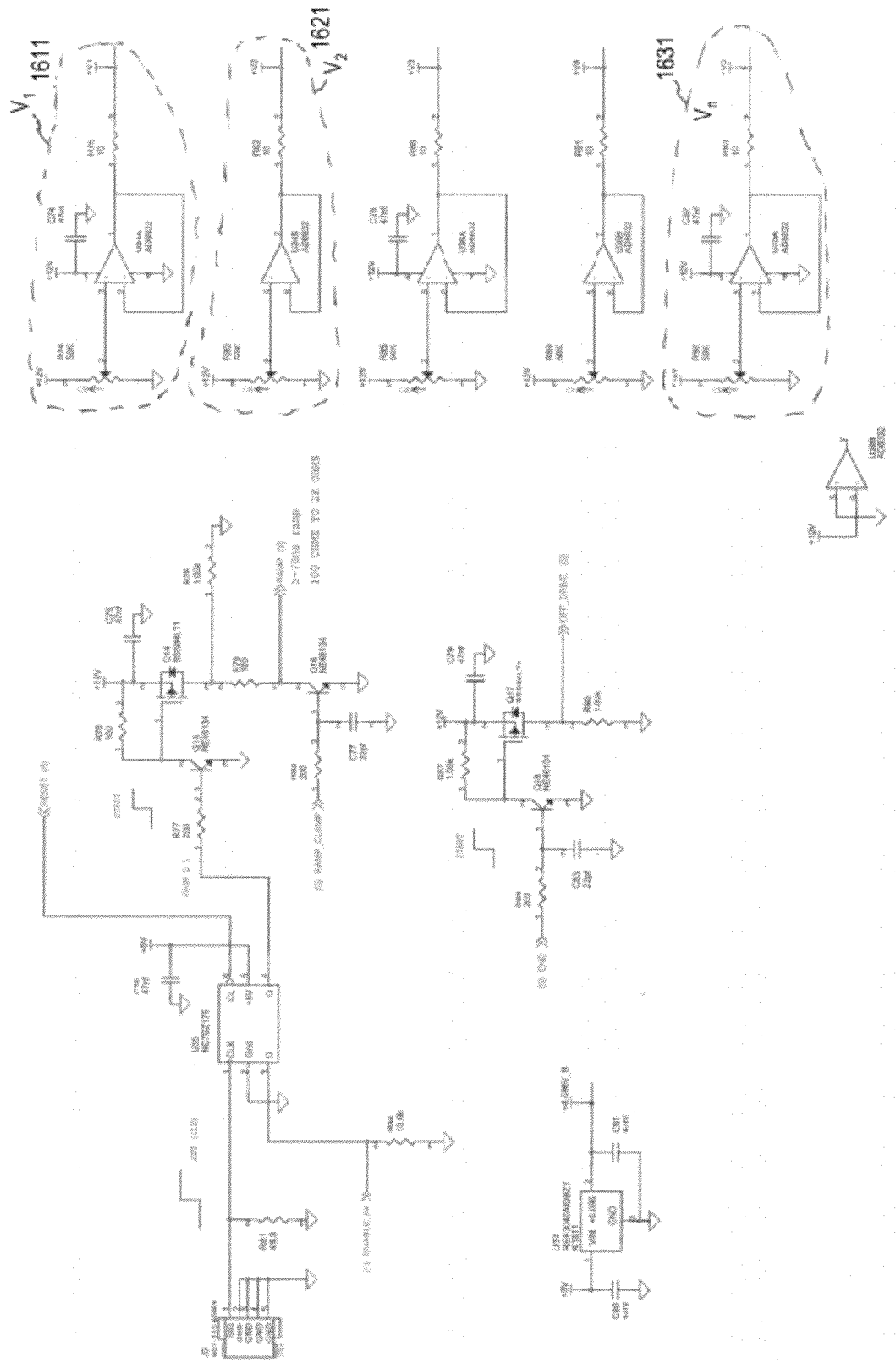
FIG. 16B2

FIG. 16B3
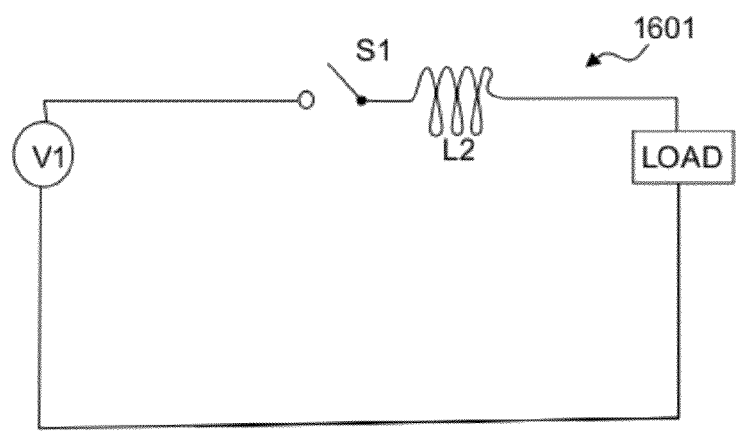

Spectral traces

Shaped current drive: Temporal traces

Temporal seed trace and amplified seed trace

The results showed the gain switched spike was significantly reduced, however, not fully eliminated. The pulsed bias did not work so well.

APPARATUS AND METHOD TO SUPPRESS GAIN-SWITCHED SPIKES IN FIBER LASER AMPLIFIER SYSTEMS

CROSS-REFERENCE TO RELATED APPLICATIONS

This is a divisional of, and claims benefit under 35 U.S.C. §120 of, U.S. patent application Ser. No. 12/715,308 filed Mar. 1, 2010, titled "APPARATUS AND METHOD FOR GENERATING OPTICAL-SEED PULSES FOR HIGH-POWERED FIBER-LASER AMPLIFIER SYSTEMS" (which issued as U.S. Pat. No. 7,991,027 on Aug. 2, 2011), which is a divisional of U.S. patent application Ser. No. 11/623,058 filed Jan. 12, 2007, titled "APPARATUS AND METHOD FOR GENERATING CHIRP-SLICE CONTROLLED-LINEWIDTH LASER-SEED SIGNALS" (which issued as U.S. Pat. No. 7,701,987 on Apr. 20, 2010), which was a divisional of U.S. patent application Ser. No. 11/488,910 filed Jul. 17, 2006, titled "APPARATUS AND METHOD FOR GENERATING CONTROLLED-LINEWIDTH LASER-SEED-SIGNALS FOR HIGH-POWERED FIBER-LASER AMPLIFIER SYSTEMS" (which issued as U.S. Pat. No. 7,539,231 on May 26, 2009), which claimed benefit under 35 U.S.C. §119(e) of U.S. Provisional Patent Application No. 60/699,894 filed Jul. 15, 2005, titled "APPARATUS AND METHOD FOR GENERATING CONTROLLED-LINEWIDTH LASER-SEED-SIGNALS FOR HIGH-POWERED FIBER-LASER AMPLIFIER SYSTEMS," each of which is incorporated herein by reference in its entirety.

This invention is also related to U.S. patent application Ser. No. 11/623,056 filed Jan. 12, 2007 as a divisional of U.S. patent application Ser. No. 11/488,910, titled "APPARATUS AND METHOD FOR TEMPORALLY SHAPING DRIVE CURRENT TO SEED-SIGNAL-LASER-DIODES FOR HIGH-POWERED FIBER-LASER AMPLIFIER SYSTEMS" (which issued as U.S. Pat. No. 7,545,836 on Jun. 9, 2009).

STATEMENT REGARDING FEDERALLY SPONSORED RESEARCH OR DEVELOPMENT

A portion of this invention was made with Government support under contract awarded by the U.S. Government. The Government has certain rights in the invention.

A portion of this invention was made with Government support under contract # N68936-03-C-0098 awarded by the U.S. Navy. The Government has certain rights in the invention.

FIELD OF THE INVENTION

The invention relates generally to lasers and nonlinear optical frequency conversion and more particularly to methods and apparatus applicable for generating controlled-linewidth laser-seed-signals for high-power fiber-laser amplifier systems.

BACKGROUND OF THE INVENTION

The broad gain bandwidth of conventional fiber-laser systems allows for operation over a wide range of wavelengths, or even tunable operation. For the simplest fiber laser system with cavity mirrors having broad reflectivity, the output wavelength can be very broad and can vary with pump power, fiber length, and/or other parameters. In some cases, a fiber Bragg grating (FBG) can be used as a narrow-band reflector to limit the linewidth of the fiber laser system, but the range of linewidths that can be generated is limited, and methods and apparatus to extend the available range are not straightforward. For instance, the minimum bandwidth that can be generated with an FBG is typically on the order of 6-10 GHz for standard fiber and is even larger for polarization-maintaining (PM) fiber. An additional complication is that the fiber laser system using an FBG typically will operate only near the peak reflectivity, resulting in a laser linewidth that can be substantially less than the FBG bandwidth. Alternatively, nonlinear effects in the fiber can broaden the laser linewidth to be substantially greater than the FBG bandwidth, particularly for high-peak-power pulsed-fiber lasers, or even continuous-wave (CW) lasers that can often exhibit noisy, unstable output.

The power that can be generated from fiber lasers and fiber-laser amplifiers can often be limited by nonlinear optical effects in the gain and/or delivery fibers used in the system. In particular, Stimulated Brillouin Scattering (SBS) is a well-known phenomenon that can lead to power limitations or even the destruction of a high-power fiber-laser system due to sporadic or unstable feedback, self-lasing, pulse compression and/or signal amplification.

There is a need for laser systems, particularly fiber-laser amplifiers, where the linewidth of the emission to be generated must be engineered to lie within a certain range of values. This need can arise for instance, when a fiber-laser system must produce optical wavelengths that only lie within a narrow linewidth, e.g., for coherent detection, coherent phasing of multiple systems, or bandwidth acceptance of nonlinear optical processes. On the other hand, narrow linewidth can lead to some types of nonlinear optical effects in the gain or delivery fiber of the system, limiting the peak power that can be generated in such a system.

The optimum seed source for a fiber amplifier system would be stable, low-noise and produce a given linewidth as required for the particular application. If polarized output is required from the system, its polarization properties must be much better than the requirements for the output as well. The simplest, most robust, seed sources typically used are Fabry-Perot laser diodes or fiber lasers. These are multi-line and in the case of the laser diodes, the output can extend to several nm or more. FIG. 1 shows an output spectrum for a Fabry-Perot laser diode centered around 1060 nm. On this scale, the mode structure is apparent, with "gaps" in the spectrum. Multi-longitudinal mode fiber lasers typically have much narrower mode spacing and may operate on a much smaller number of modes, but the phenomenon is similar.

FIG. 1 shows an emission spectrum from a Fabry-Perot laser diode showing multi-longitudinal mode emission over a wavelength range of approximately 3 nm (about 900 GHz).

One issue with this type of seed source is that the spectral distribution of power is not constant, but the power can fluctuate between the modes. This is known as "mode partition noise" and the timescale for redistribution of the spectral power can be on the same scale as the SBS build-up time of a few nanoseconds (e.g., about 5 to 10 ns). This can lead to the occurrence of SBS in the fiber amplifier system, even though the average linewidth of the seed source may be sufficient to avoid the SBS.

Single-frequency laser diodes or fiber lasers avoid the problem of mode partition noise and can be used for a number of applications. Particularly for situations where very narrow linewidth is required, these offer linewidths on the order of a few MHz (diodes) down to tens of kHz (fiber lasers). However, this linewidth is more narrow than actually needed for some applications and worsens nonlinear fiber effects such as SBS. For instance, the bandwidth acceptance for frequency doubling can be ten's of GHz so a linewidth narrower than a broad-band free-running fiber laser may be required but a single frequency source may be much narrower than actually needed and could lead to lower power or instabilities due to fiber nonlinearities.

What are needed are improved seed sources that help avoid the above-described problems and provide other benefits.

SUMMARY OF THE INVENTION

In some embodiments, the invention provides methods of generating polarization-maintaining, controlled-linewidth seed signals for high-power fiber-amplifier systems.

BRIEF DESCRIPTION OF THE DRAWINGS

FIG. 16A is a simplified schematic of a pulsed current source that generates a very fast current pulse, where the current magnitude varies as a function of time, increasing the current later in the pulse to compensate for the reduction in gain over time in a fiber gain medium.

FIG. 16B (which includes 16B1 and 16B2 and 16B3) includes a detailed schematic and a simplified schematic of a pulsed current source that generates a very fast current pulse, where the current magnitude varies as a function of time, increasing the current later in the pulse to compensate for the reduction in gain over time in a fiber gain medium.

DETAILED DESCRIPTION OF THE INVENTION

Figure 1:
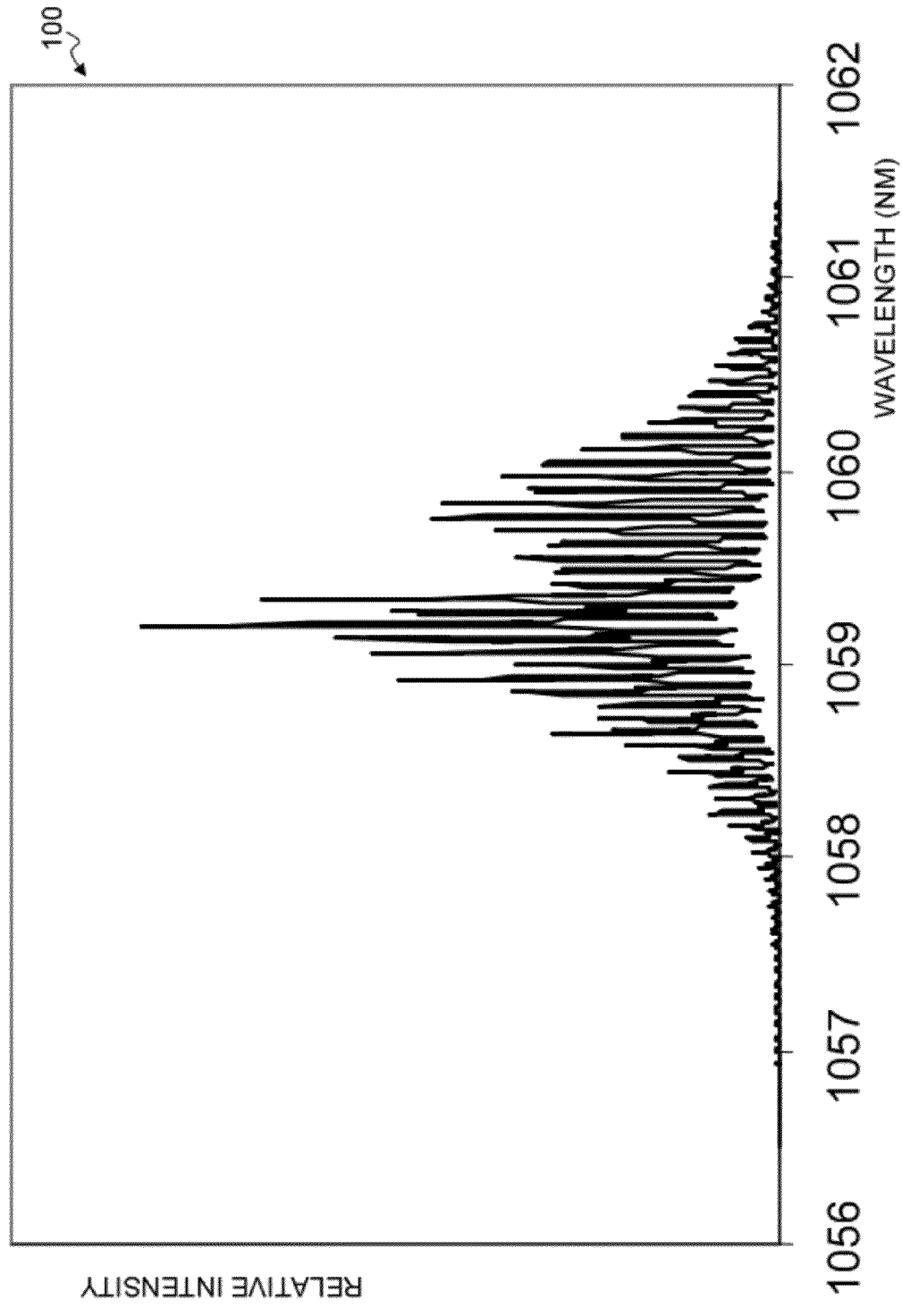
FIG. 1 is a graph 100 of intensity versus wavelength for an exemplary seed signal.

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Stimulated Brillouin Scattering (SBS) can lead to power limitations or even the destruction of a high-power fiber-laser system due to sporadic or unstable feedback, self-lasing, pulse compression and/or signal amplification. SBS can be triggered by a seed source having a wavelength bandwidth that is sufficiently narrow (e.g., about 50 MHz).

One way to generate output with more controlled attributes is to use a master-oscillator power-amplifier (MOPA) architecture. The oscillator can be optimized to generate a laser seed signal having the appropriate characteristics, such as linewidth, and the power amplifier is used to increase the output power and/or pulse energy to much higher levels.

In some embodiments, the present invention generates a controlled linewidth that depends on the actual value required. In some embodiments, the present invention provides a seed source based on spectral filtering of an amplified-stimulated emission (ASE) source using fiber Bragg gratings (FBG) that was developed and demonstrated for linewidths greater than approximately 10 GHz. In some embodiments, the present invention provides a spectral filter using a bulk diffraction grating, allowing for filtering down to a few GHz, using a similar technique. For linewidths narrower than this, but greater than the few MHz linewidths of a single longitudinal mode laser diode, some embodiments of the invention provide methods using the wavelength shift that occurs during rapid turn-on of a laser diode, or "chirp". While the ASE source can be used for pulsed or CW (continuous wave) applications, in some embodiments, the chirped single frequency diode source is limited to pulsed applications, although, in some embodiments, a plurality of chirped diode sources that have pulsed, chirped outputs that are staggered over time can be multiplexed together in order to provide a composite output signal that is CW or nearly CW.

Spectrally-Filtered ASE Source

A number of tests have been performed with different Yb-doped fiber and lengths to investigate their possible use as an ASE source. In some embodiments, fibers (e.g., in some embodiments, based on alumina-silicate glass) that are doped with ytterbium (Yb) to provide a high gain at a wavelength of about 1030 nm to 1080 nm. Some embodiments use a bulk diffraction grating to generate a 0.1 nm linewidth (about 25 GHz). Other embodiments use one or more FBGs (Fiber Bragg Gratings) with a 0.1 nm linewidth in either polarization-maintaining (PM) or HI1060-type fiber in place of the bulk diffraction grating. Optimizations of some embodiments start with a very low power CW signal that is amplified to about 100 mW. In some embodiments, the signal is then modulated using an acousto-optic modulator to produce pulses of 100 ns to 400 ns duration at a PRF (pulse repetition frequency) of 10 kHz. Finally, the pulsed seed signal is amplified in several more YDFA (Yb-doped fiber amplifier) stages.

Figure 2:
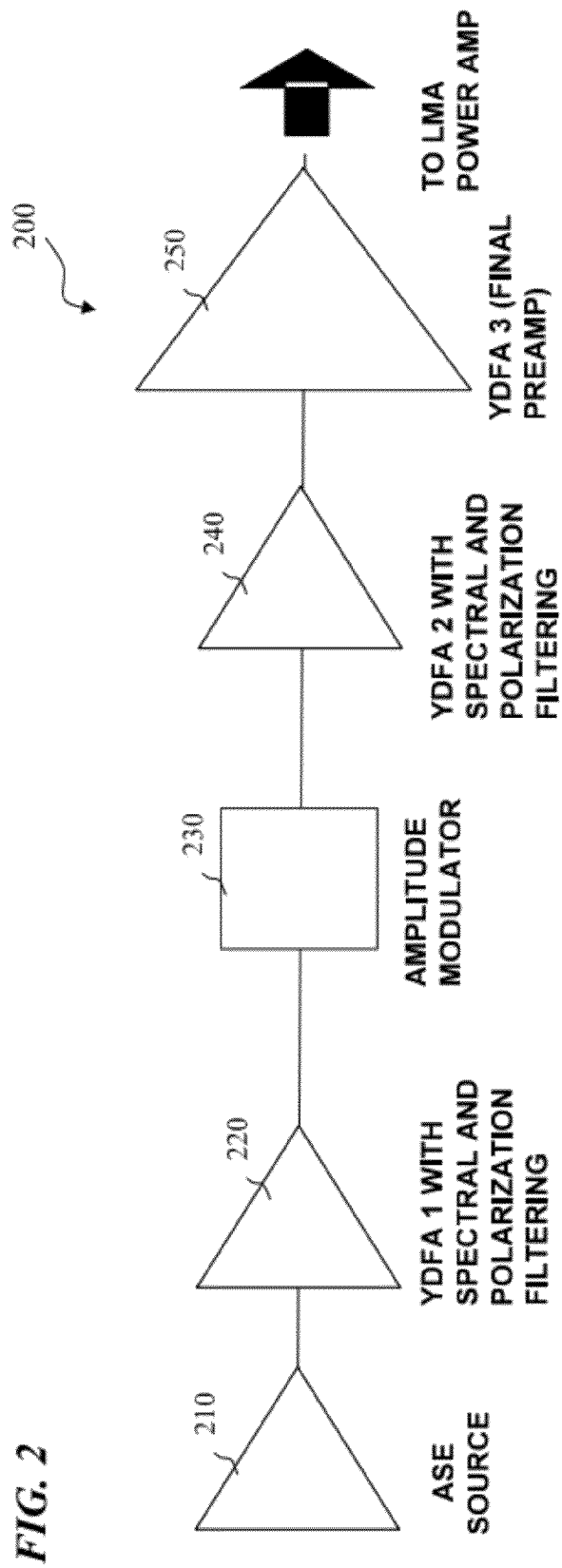
FIG. 2 is a block diagram of a controlled linewidth seed source 200 based on spectral filtering of ASE.

FIG. 2 is a block diagram of a controlled-linewidth seed source 200 based on spectral filtering of ASE. In some embodiments, source 200 includes an ASE source 210, a Yb-doped fiber amplifier (YDFA) 220 having spectral and polarization filtering, an amplitude modulator 230 (which, in some embodiments, generates flat-topped pulses of about 100 ns duration and at a rate of 10K/second), a YDFA 240 having spectral and polarization filtering, and a YDFA 250 as a final preamplifier stage. In some embodiments, the 100-ns pulses from amplitude modulator 230 have by this stage, been shortened to about 20 to 30 ns by pulse steepening (described below). In some embodiments, the output from stage 250 is amplified by a large-mode-area (LMA) power amplifier as desired. In some embodiments, the LMA power amplifier is a high-gain amplifier that is otherwise prone to SBS.

Figure 3:
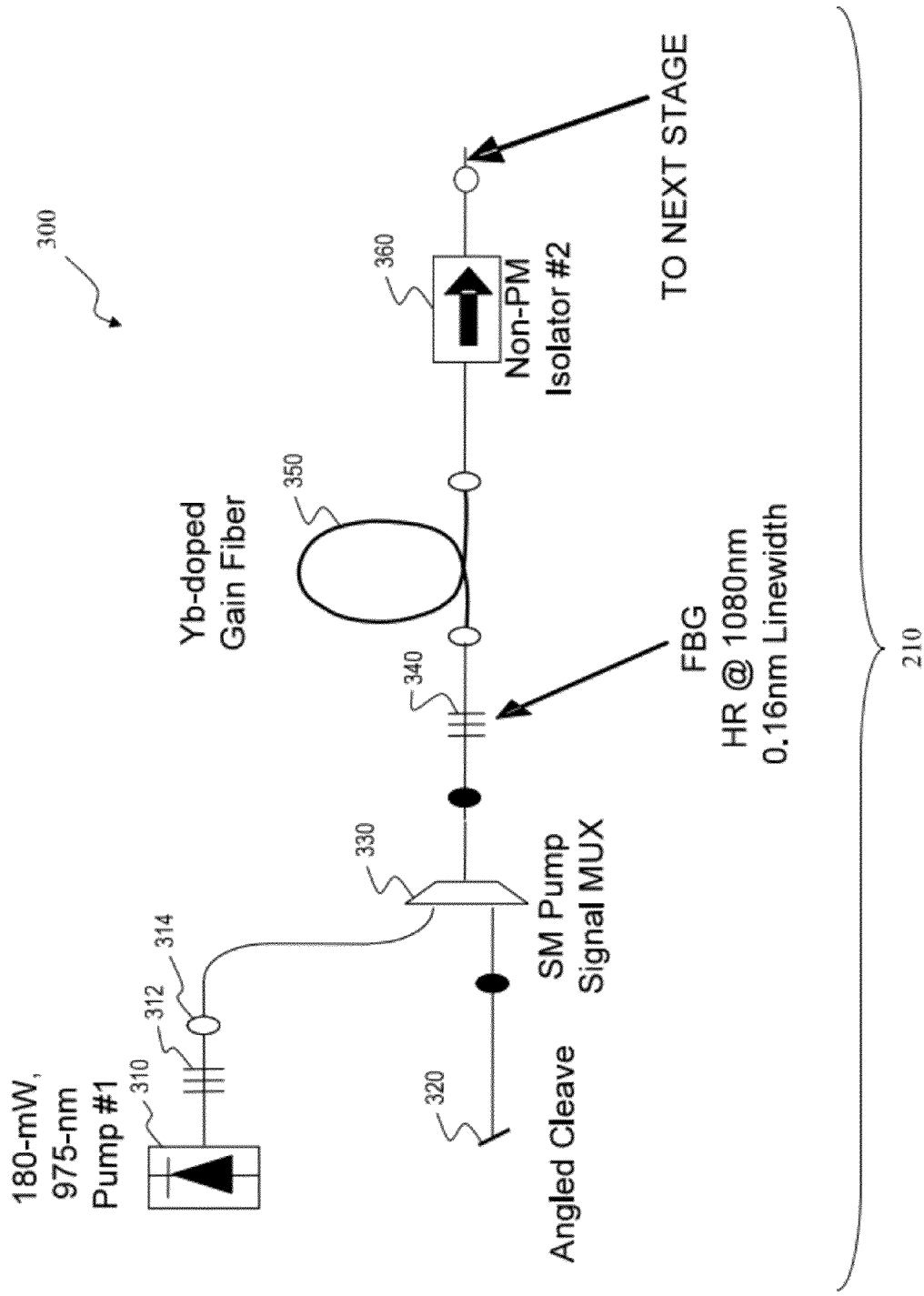
FIG. 3 shows a schematic diagram of a seeded ASE source 300 having an FBG at one end of the ASE fiber source to "seed" a given wavelength.

FIG. 3 shows a schematic diagram of a seeded ASE source 300 having an FBG 340 at one end of the ASE fiber source to "seed" a given wavelength. In some embodiments, source 300 can be used as ASE source 210 of FIG. 3. In some embodiments, source 300 includes a laser diode pump 310 (e.g., in some embodiments, a 180-mW, 975-nm laser diode) followed by a fiber Bragg grating 312 to lock stability, and a fiber coupler 314, and the output goes into single mode (SM) pump/signal multiplexer (MUX) 330. In some embodiments, MUX 330 has as its other left-hand port, a angle-cleaved fiber end 320, which together with MUX 330, helps minimize reflections that could cause lasing in Yb-doped fiber 350 (in some embodiments, a 55-dB reduction is reflection is obtained this way). Fiber Bragg grating (FBG) 340 at the left end of the ASE fiber source (Yb-doped fiber 350) is used to "seed" a given wavelength (e.g., in some embodiments, it is highly reflective (HR) at 1080 nm with a linewidth of about 0.16 nm, thus providing enough feedback to fiber 350 (which has a gain width from about 1030 nm to 1080 nm, depending on fiber length and pump power) to amplify at 1080 nm with a linewidth of about 0.16 nm, but this and the other parts are adjusted, if needed, to prevent lasing in fiber 350. In some embodiments, the output of fiber 350 is passed through a non-polarization-maintaining isolator 360 and coupled to the next stage (e.g., stage 220 of FIG. 2, in some embodiments).

Figure 4:
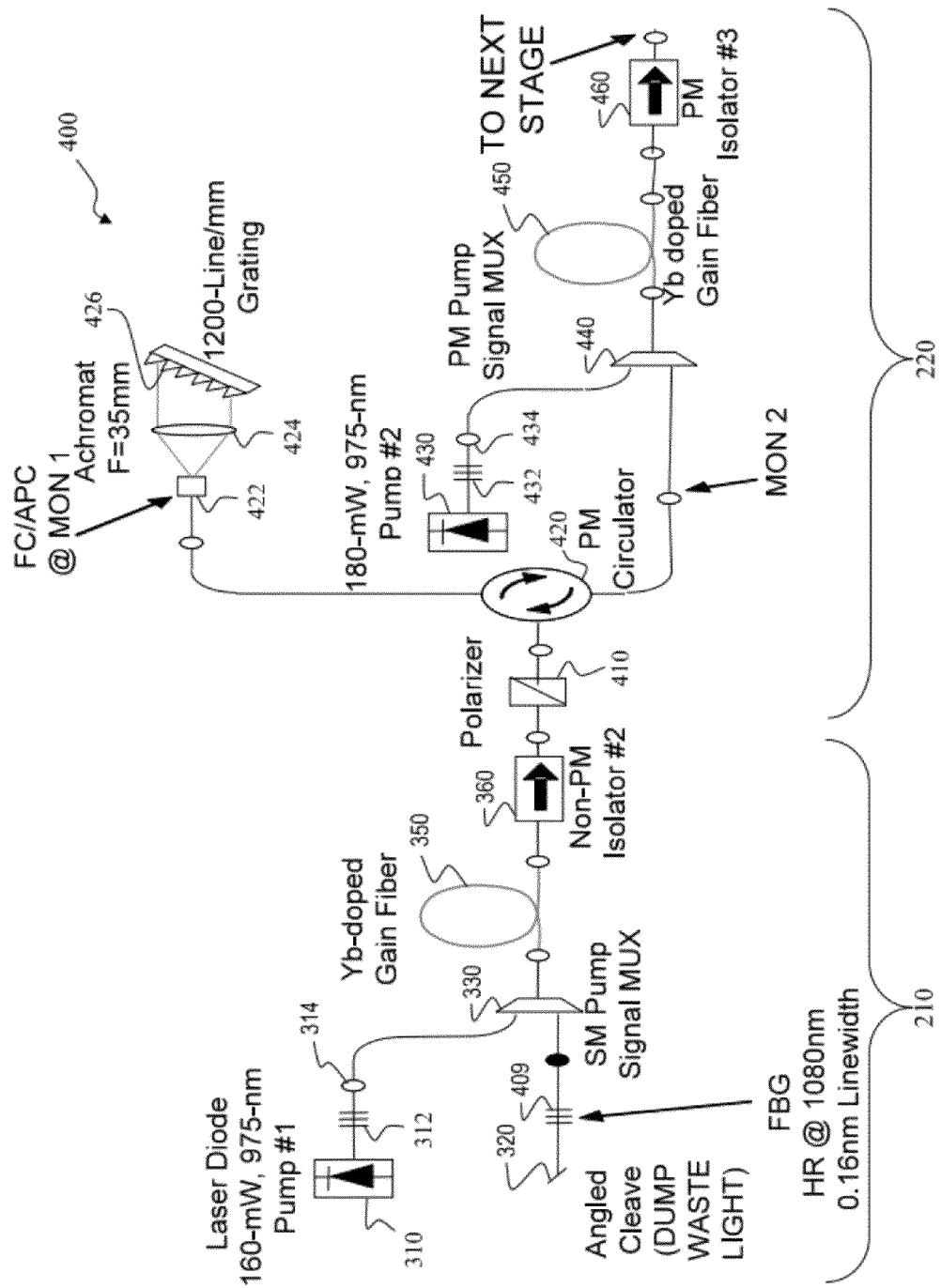
FIG. 4 shows a schematic diagram of a seeded ASE source 400 having spectral filtering using a bulk diffraction grating spectral filter and a circulator.

FIG. 4 shows a schematic diagram of a seeded ASE source 400 having spectral filtering using a bulk diffraction grating spectral filter and a circulator. In some embodiments, the portion to the left of polarizer 410 is identical to that of source 300 of FIG. 3, while in other embodiments, an additional FBG 409 is added to the signal path to the left of MUX 330, and Fiber Bragg grating FBG 340 between the left end of the Yb-doped fiber 350 and MUX 330 is omitted (e.g., the FBG 340 of FIG. 3 is moved to the left-hand side of MUX 330 from the right-hand side). (In some embodiments, the portion to the left of polarizer 410 is used for block 210 of FIG. 2, and polarizer 410 and the portion to the right of polarizer 410 is used for block 220 of FIG. 2.) In some embodiments, the output from non-polarization-maintaining isolator 360 is passed through a polarizer 410 and into polarization-maintaining circulator 420 (which, in some embodiments, is a fairly lossy component). Some of the signal then passes from circulator 420 to bulk grating 426 through fiber-coupler/angle polished connector (FC/APC) 422 and achromat lens 424 (which, in some embodiments, has a focal length of 35 mm). In some embodiments, bulk grating 426 is set at an angle to reflect 1080-nm light back to circulator 420. The main output of circulator 420 then passes to PM amplifying fiber 450, which is pumped by laser diode 430 (e.g., in some embodiments, a 180 mW, 975 nm laser diode) followed by a fiber Bragg grating 432 to lock stability, and a fiber coupler 434, and a MUX 440 (which is used to combine the signal and pump light and/or minimize reflections). The linewidth-limited output of PM amplifying fiber 450 is passed through PM isolator 460 and on to the next stage (e.g., block 230 of FIG. 2).

Figure 5A:
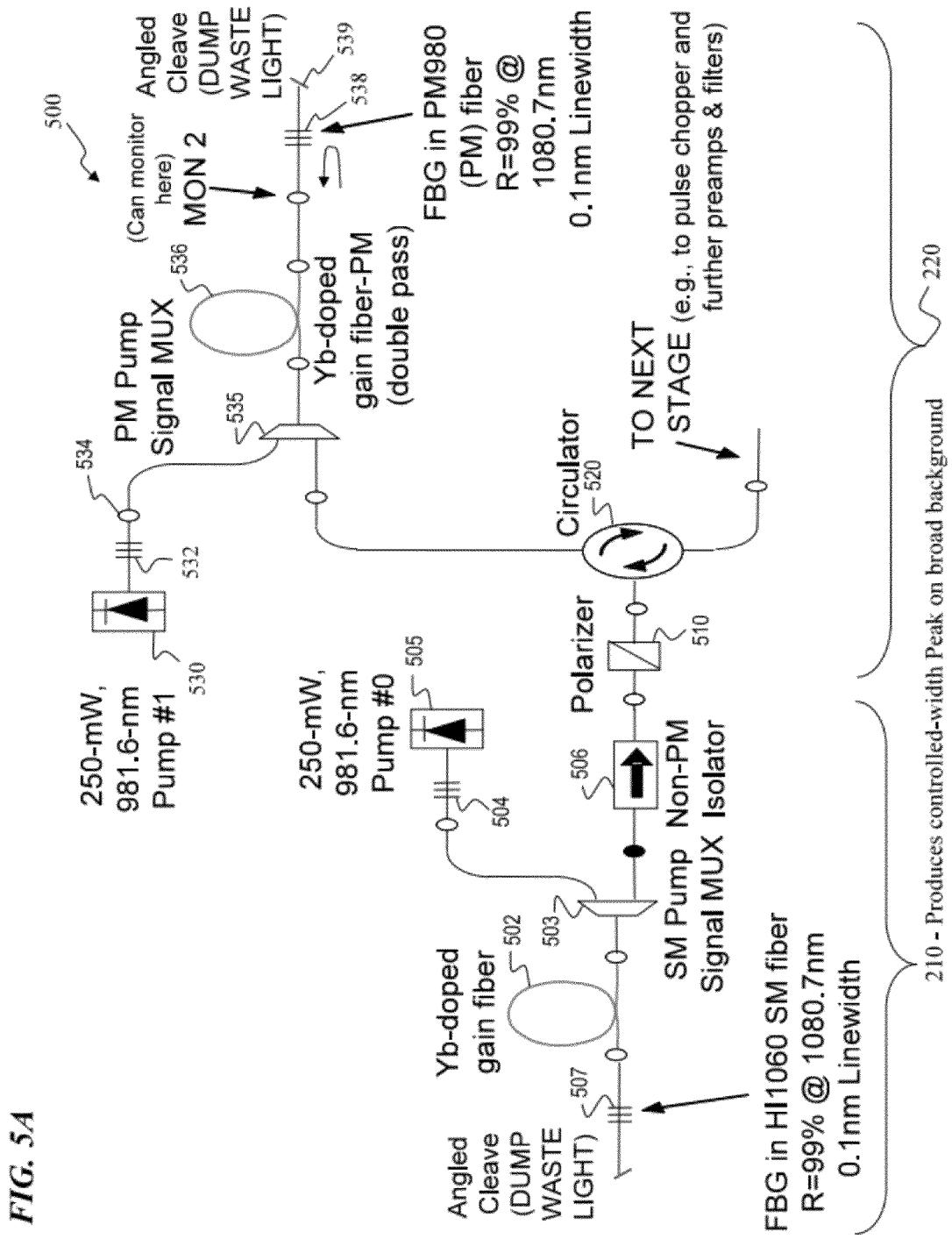
FIG. 5A shows a schematic diagram of a seeded ASE source 500 with double-pass amplifier using FBG filter with circulator.

FIG. 5A shows a schematic diagram of a seeded ASE source 500 with double-pass amplifier using FBG filter with circulator. In some embodiments, the portion to the left of polarizer 510 is used in place of source 300 of FIG. 3. In some embodiments, source 500 includes a laser diode pump 505 (e.g., in some embodiments, a 250 mW, 981.6 nm laser diode) followed by a fiber Bragg grating 504 to lock stability, and a fiber coupler, and the pump output goes into single mode (SM) pump/signal multiplexer (MUX) 503. In some embodiments, MUX 503 outputs pump light to ASE fiber 502. Fiber Bragg grating (FBG) 509 at the left end of the ASE fiber source (Yb-doped fiber 502) is used to "seed" a given wavelength (e.g., in some embodiments, it is highly reflective (HR) at 1080.7 nm with a linewidth of about 0.1 nm, thus providing enough feedback to fiber 502 to amplify at 1080.7 nm with a linewidth of about 0.1 nm, but this and the other parts are adjusted, if needed, to prevent lasing in fiber 502. In some embodiments, the output of fiber 502 is passed through MUX 503 and through a non-polarization-maintaining isolator 506 and coupled to the next stage (e.g., to stage 220 of FIG. 2, in some embodiments). Here, in some embodiments, the output from non-polarization-maintaining isolator 506 is passed through a polarizer 510 and into polarization-maintaining circulator 520 (which, in some embodiments, is a fairly lossy component). Some of the signal then passes from circulator 520 to FBG filter 538 through MUX 535, which mixes this signal with pump light from laser diode 530 (e.g., in some embodiments, a 250 mW, 981.6 nm laser diode) followed by a fiber Bragg grating 532 to lock stability, and a fiber coupler 534. Any light exiting to the right of FBG 538 is dumped out angled cleave fiber end 539. This combined pump and signal is amplified by Yb-doped PM amplifying fiber 536, is reflected by PM FBG 538 (which, in some embodiments, reflects 99% at 1080.7 nm with a 0.1 nm linewidth) then passes again through, and again is amplified by, Yb-doped PM amplifying fiber 536. This reflected 1080-nm light goes back to circulator 520.

The main output of circulator 520 of FIG. 5A then passes to the next stage (e.g., such as the following portions of FIG. 4: PM amplifying fiber 450, which is pumped by laser diode 430 (e.g., in some embodiments, a 180 mW, 975 nm laser diode) followed by a fiber Bragg grating 432 to lock stability, and a fiber coupler 434, and a MUX 440 (which is used to combine the signal and pump light and/or minimize reflections). The linewidth-limited output of PM amplifying fiber 450 is passed through PM isolator 460 and on to the next stage (e.g., block 230 of FIG. 2).

Figure 5B:
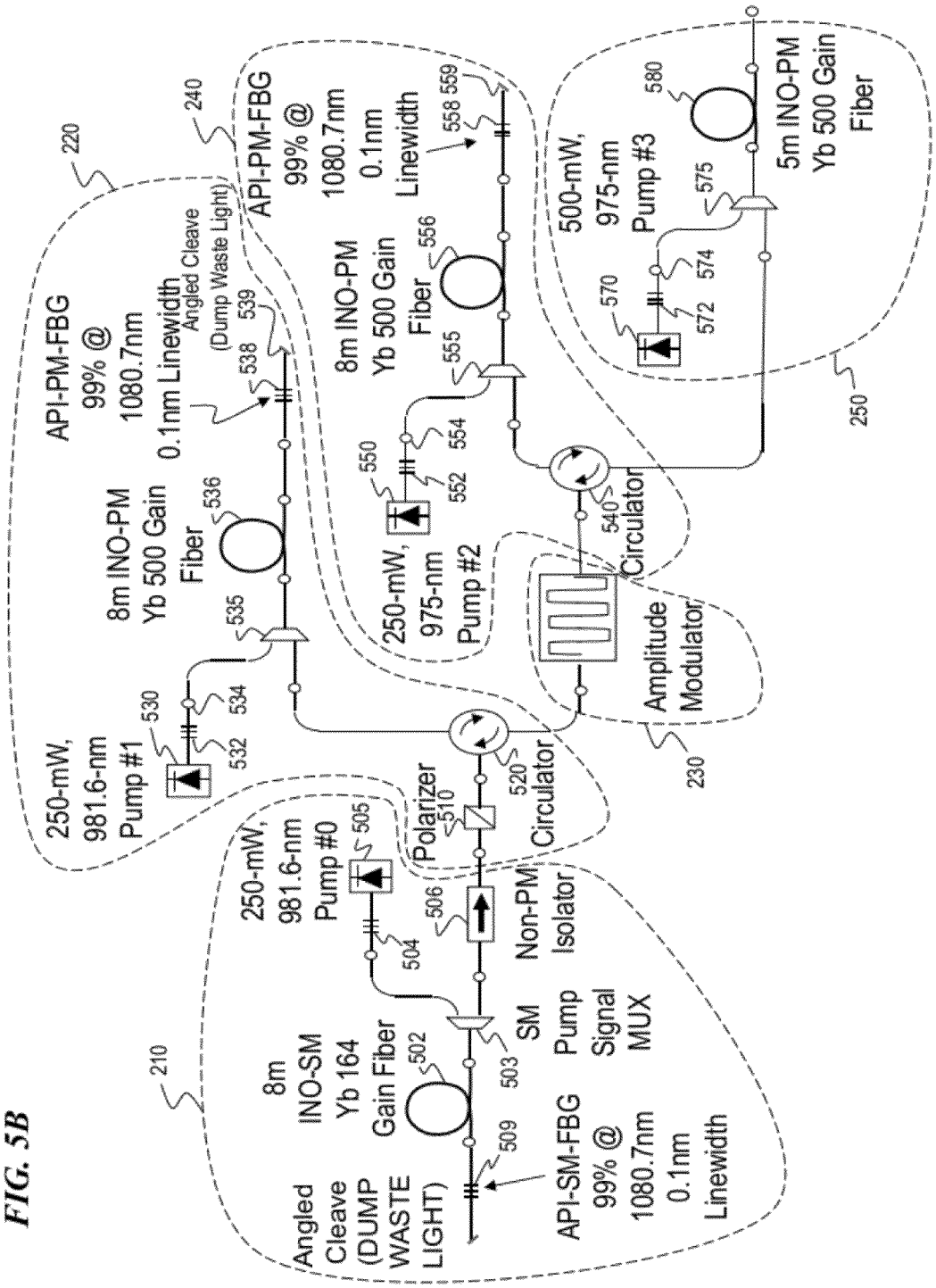
FIG. 5B shows a schematic diagram of an improved seeded ASE source 501 with double-pass amplifier using FBG filter with circulator.

FIG. 5B shows a schematic diagram of an improved seeded ASE source 501 with double-pass amplifier using FBG filter with circulator. In some embodiments, the portion to the left of polarizer 510 is used in place of source 300 of FIG. 3. In some embodiments, source 501 includes a laser diode pump 505 (e.g., in some embodiments, a 250-mW, 981.6-nm laser diode) followed by a fiber Bragg grating 504 to lock stability, and a fiber coupler, and the pump output goes into single mode (SM) pump/signal multiplexer (MUX) 503. In some embodiments, MUX 503 outputs pump light to ASE fiber 502 (e.g., a type YB 164 fiber from INO company). Fiber Bragg grating (FBG) 509 at the left end of the ASE fiber source (Yb-doped fiber 502) is used to "seed" a given wavelength (e.g., in some embodiments, it is highly reflective (HR) at 1080.7 nm with a linewidth of about 0.1 nm, thus providing enough feedback to fiber 502 to amplify at 1080.7 nm with a linewidth of about 0.1 nm, but this and the other parts are adjusted, if needed, to prevent lasing in fiber 502. Signal leaving the left end of FBG 509 exits an angled cleaves fiber end, to minimize reflections. In some embodiments, the right-hand output of fiber 502 is passed through MUX 503 and through a non-polarization-maintaining isolator 506 and coupled to the next stage (e.g., to stage 220 of FIG. 2, in some embodiments). Here, in some embodiments, the output from non-polarization-maintaining isolator 506 is passed through a polarizer 510 and into circulator 520 (which, in some embodiments, is a fairly lossy component). Some of the signal then passes from circulator 520 to FBG filter 538 through MUX 534, which mixes this signal with pump light from laser diode 530 (e.g., in some embodiments, a 250-mW, 981.6-nm laser diode) followed by a fiber Bragg grating 532 to lock stability, and a fiber coupler 534. Any light exiting to the right of FBG 538 is dumped out angled cleave fiber end 539. Combined pump and signal is amplified by Yb-doped PM amplifying fiber 536 (e.g., a type YB 500 fiber from INO company), is reflected by PM FBG 538 (which, in some embodiments, reflects 99% at 1080.7 nm with a 0.1 nm linewidth) then passes again through PM amplifying fiber 536 and again is amplified by Yb-doped PM amplifying fiber 536. This reflected 1080-nm light goes back to circulator 520.

The main output of circulator 520 of FIG. 5B then passes to the next stage, starting with amplitude modulator 230 (which, in some embodiments, produces pulses about 100 ns long at a rate of 20,000 pulses per second) and into circulator 540. Some of the signal then passes from circulator 540 to FBG filter 558 through MUX 554, which mixes this signal with pump light from laser diode 550 (e.g., in some embodiments, a 250-mW, 975-nm laser diode) which is followed by a fiber Bragg grating 552 to lock stability, and a fiber coupler 554. Any light exiting to the right of FBG 558 is dumped out angled cleave fiber end 559. Combined pump and signal is amplified by Yb-doped PM amplifying fiber 556 (e.g., 8 meters of a type YB 500 fiber from INO (Sainte-Foy CANADA)—ino.zc.bmgmultimedia.com), is reflected by PM FBG 558 (which, in some embodiments, reflects 99% at 1080.7 nm with a 0.1 nm linewidth) then passes again through PM amplifying fiber 556 and again is amplified by Yb-doped PM amplifying fiber 556. This reflected 1080-nm light goes back to circulator 540, whose main output passes down and to the right to amplifier 250. In some embodiments, amplifier 250 includes MUX 575, which mixes this signal with pump light from laser diode 570 (e.g., in some embodiments, a 500-mW, 975-nm laser diode) which is followed by a fiber Bragg grating 572 to lock stability, and a fiber coupler 574. The combined pump and signal pass into Yb-doped PM amplifying fiber 556 (e.g., 8 meters of a type YB 500 fiber from INO company) which amplifies the signal, which is then output to a next stage (e.g., a high power (e.g., 10 watts or more) large-mode-area gain fiber (e.g., as available from, for example, Nufern (East Granby, Conn.)—see www.nufern.com).

Chirped Operation of a Single-Longitudinal-Mode Laser Diode

In CW operation, the linewidth of the single frequency laser diode is on the order of a few MHz. The linewidth of the same laser diode in pulsed operation is broadened significantly due to carrier inversion and thermal effects. In longer pulsed laser diodes (pulsewidth >5 nsec) the dominate cause of the broadening is thermal. The linewidth of the laser diode will increase as the thermal load on the chip is increased until the mode-hop threshold has been surpassed.

As current is pulsed through the semiconductor material that defines the laser cavity a significant amount of the electrical power is transformed into heat. When the laser cavity is heated, the effective length of the cavity changes and as a result the discrete mode that the cavity can support changes. If the temperature and associated cavity length changes excessively during the time the pulse is being generated the mode supported at the beginning of the pulse and the mode supported at the end of the pulse will change. The shift from one mode to another is referred to as mode hopping. Mode hopping can have detrimental consequences in a laser or laser amplifier system but by carefully selecting the maximum current, CW bias current and pulse duration mode hopping can be eliminated.

Mode hopping is caused by a significant change in the temperature of the laser cavity while the pulse is being generated. In order to mitigate any mode-hopping issues, we have taken steps to minimize the temperature change by minimizing the change in the drive current that act as the heat source during the pulse generation. The first step is to optimize the CW bias current. The CW bias current should be set as high as possible without exceeding the laser threshold current. The CW bias current heats the laser cavity during the time between pulses which reduces the total change in the heat load the laser cavity will experience when pulsed. The pulse duration is then set to the minimum pulse width required. By minimizing the time that the laser is driven at maximum current the power and associated heat dumped into the laser cavity is also minimized. The third optimization point is the maximum drive current. The maximum current is selected by adjusting the pulsed drive current level until mode hopping is observed. The maximum current is then reduced by some fraction (but still greater than the threshold current) to ensure mode-hop-free operation.

Figure 12:
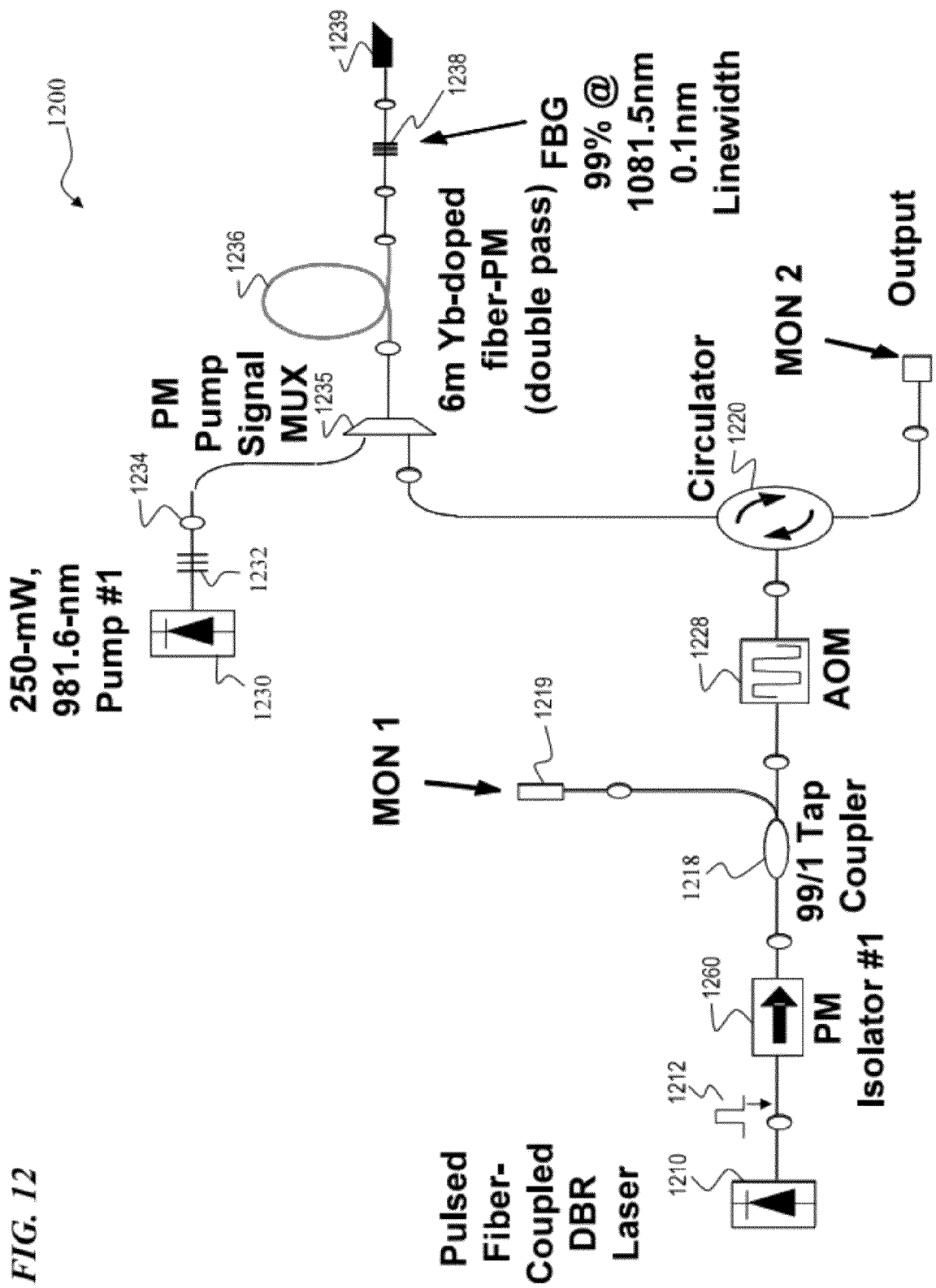
FIG. 12 is a schematic block diagram of a narrow linewidth seed source with a tunable linewidth.

FIG. 12 illustrates an optical system 1200 for "pulse slicing." In some embodiments, system 1200 is configured such that the output pulse from the single-frequency laser diode 1210 is significantly longer than the required output pulse. The long initial pulse 1212 is sent through a PM isolator 1216, coupler 1218 (e.g., a 99:1 ratio coupler), and through an optical gate 1228 (e.g., in this case an acousto-optic modulator (AOM)), and a temporally selected slice or section of the original pulse is transmitted to create a shorter duration pulse of a specific time portion and thus wavelength-chirp portion, since the original pulse is chirped) and into circulator 1220 (which, in some embodiments, is a fairly lossy component). Some of the signal then passes from circulator 1220 to FBG filter 538 through MUX 535, which mixes this signal with pump light from laser diode 1230 (e.g., in some embodiments, a 250-mW, 981.6-nm laser diode) followed by a fiber Bragg grating 1232 to lock stability, and a fiber coupler 1234. This combined pump and signal is amplified by Yb-doped PM amplifying fiber 1236, is reflected by PM FBG 1238 (which, in some embodiments, reflects 99% at 1080.7 nm with a 0.1 nm linewidth, where any light exiting to the right of FBG 1238 is dumped out angled cleave fiber end 1239) then passes again through, and again is amplified by, Yb-doped PM amplifying fiber 1236. This reflected 1080-nm light goes back to circulator 1220.

The wavelength shift (chirp) of the laser diode is more rapid at the start of the pulse and slows at later times, resulting in a nonlinear shift with time. Therefore "slices" of the original pulse have different chirp amounts depending on the relative timing of the amplitude modulator relative to the start of the original pulse. The wavelength chirp gives an effective linewidth for the pulse that can be tuned by adjusting the relative timing of the sliced pulse relative to the start of the original pulse. For instance, if a 50-ns pulse duration is required, the wavelength change during the initial 50 ns of the original 300-ns-long pulse is greater than the last 50 ns. Therefore by adjusting the AOM trigger relative to the laser diode pulse, the linewidth can be tuned continuously. If a wider linewidth is desired, the optical gate (i.e., the AOM) is adjusted to open near the beginning of the diode pulse. Conversely if a shorter linewidth is preferred the AOM would be adjusted to open towards the end of the laser diode pulse. This allows one to maintain the temporal pulsewidth but vary the linewidth of a given laser diode source.

The time-slicing technique can also be used to avoid mode hops that can occur at a certain time in a pulse. For instance, if mode hops occur during the rapid wavelength change at the beginning of the laser diode pulse, the optical gate can be adjusted to open after this time and include only the continuous wavelength change due to chirp without the discontinuous mode hop.

The current invention includes two distinct applications. The first of these applications may involve the use of a band pass filter on a broad range of frequencies to spectrally filter out a selected linewidth. The other application is slightly more complicated and involves the use of a laser diode run at a current level that is "just above threshold." This is the amount of current in a diode which causes the diode to change from absorbing light to amplifying light. At low currents, more light is absorbed than emitted. For light emission to occur, there must be enough species existing in the gain medium at an excited state. Once in this state, random spontaneous emission occurs. By adding current, the medium remains at an excited state, resulting in the amplification of whatever frequency was first emitted. As the laser diode turns on its central frequency will chirp, creating an initially broad linewidth which narrows over time. By selecting a small temporal portion of the chirp a broader or narrower linewidth will result.

Pulsed Characterization of the Laser Diode and Spectral Linewidth

One simple method to produce the appropriate linewidth is to directly modulate the laser diode and utilize the chirped wavelength output as the seed source for the amplifier system. We have demonstrated chirp-induced broadening of a DBR diode, with the goal of finding conditions that offer a broadened linewidth without mode hops. We demonstrated linewidths increased from less than 100 MHz (instrument limited) to about 0.9 GHz in pulsed operation. In some embodiments, careful adjustment of the peak current, pulse duration and operating temperature were necessary to avoid mode hops.

Figure 6:
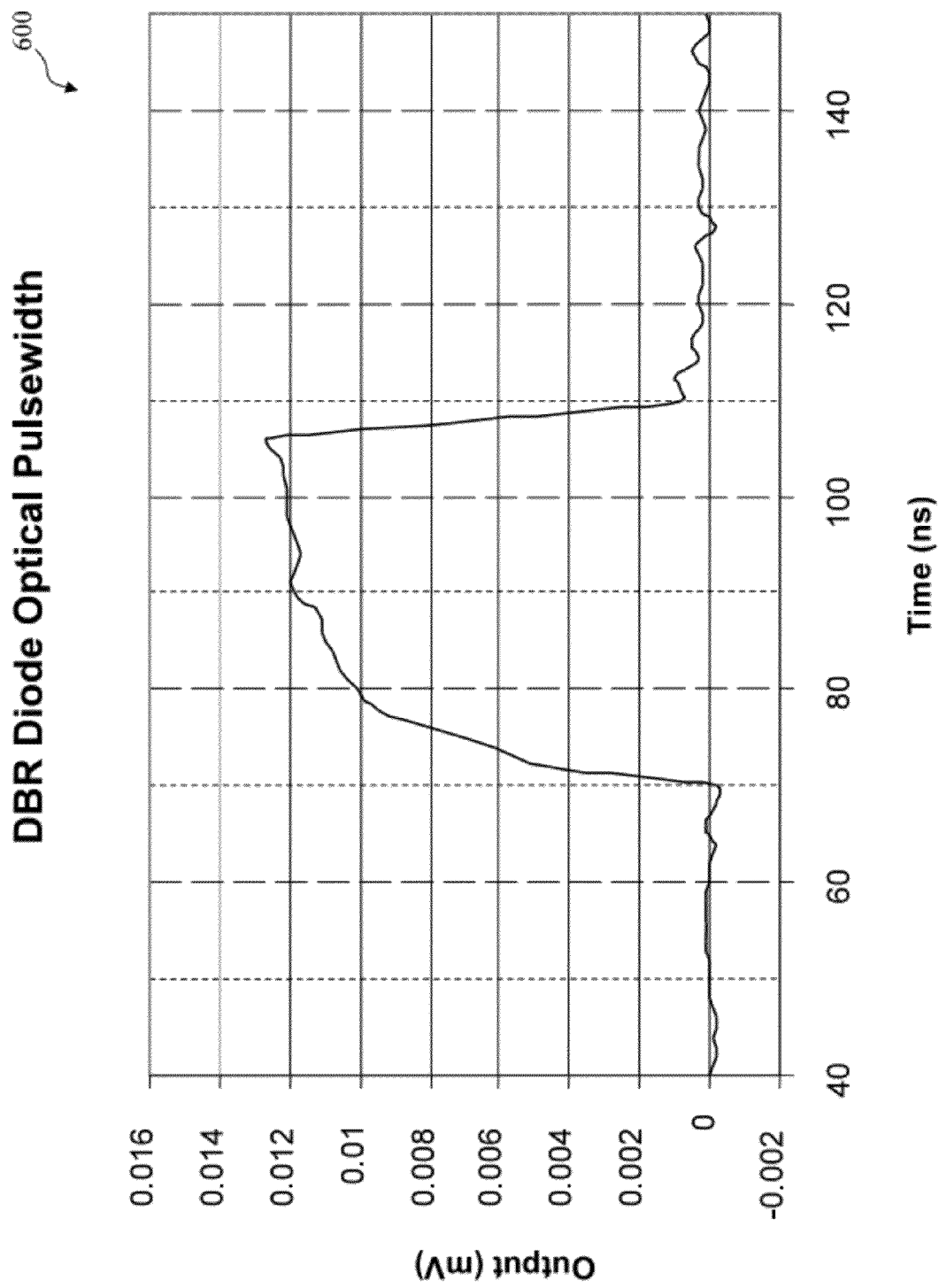
FIG. 6 is a graph of the optical output pulse for an exemplary DBR laser diode such as a Sacher Diode (e.g., one from Sacher Laserteknik, Germany, such as Model DBR-1080-80 or DBR-1060-100) driven with a pulsed current.

FIG. 6 shows the optical output of the diode. Several iterations of the pulsed current driver were tested to optimize performance and miniaturize the electronics circuit. FIG. 6 shows the most recent version of the circuit which shows the rapid turn-on and turn-off times. The focus was on characterizing the diode laser performance just slightly above threshold to limit the chirp effects as much as possible. For the final system, the goal is to shape the current pulse to counteract the effects of pulse steepening in the later amplifier stages.

Optical output pulse for one exemplary distributed Bragg-reflector (DBR) laser diode, available from the Sacher company (called the "Sacher diode"), with a pulsed current source, as used in some embodiments. In other embodiments, other suitable DBR laser diodes are used. For this data the peak drive current was set to approximately 75 mA and the measured FWHM is 34 ns. The drive current and trigger pulsewidth can be varied to change the pulse characteristics. The optical pulse shape can be adjusted to compensate for pulse steepening in later amplifier stages.

In CW operation mode hops at specific current levels were seen. It was discovered that in pulsed operation, the output showed multiple modes as seen in the OSA trace of FIG. 7. The Figure shows the optical output with 200 mA pulsed current. Attempts were made to reduce the peak drive current to operate just barely above threshold to reduce the number of modes excited. FIG. 8 shows conditions where nearly single mode was operable, by limiting the current to 75 mA. This data shows excellent side mode suppression, although a more typical value was 10-12 dB.

Figure 7:
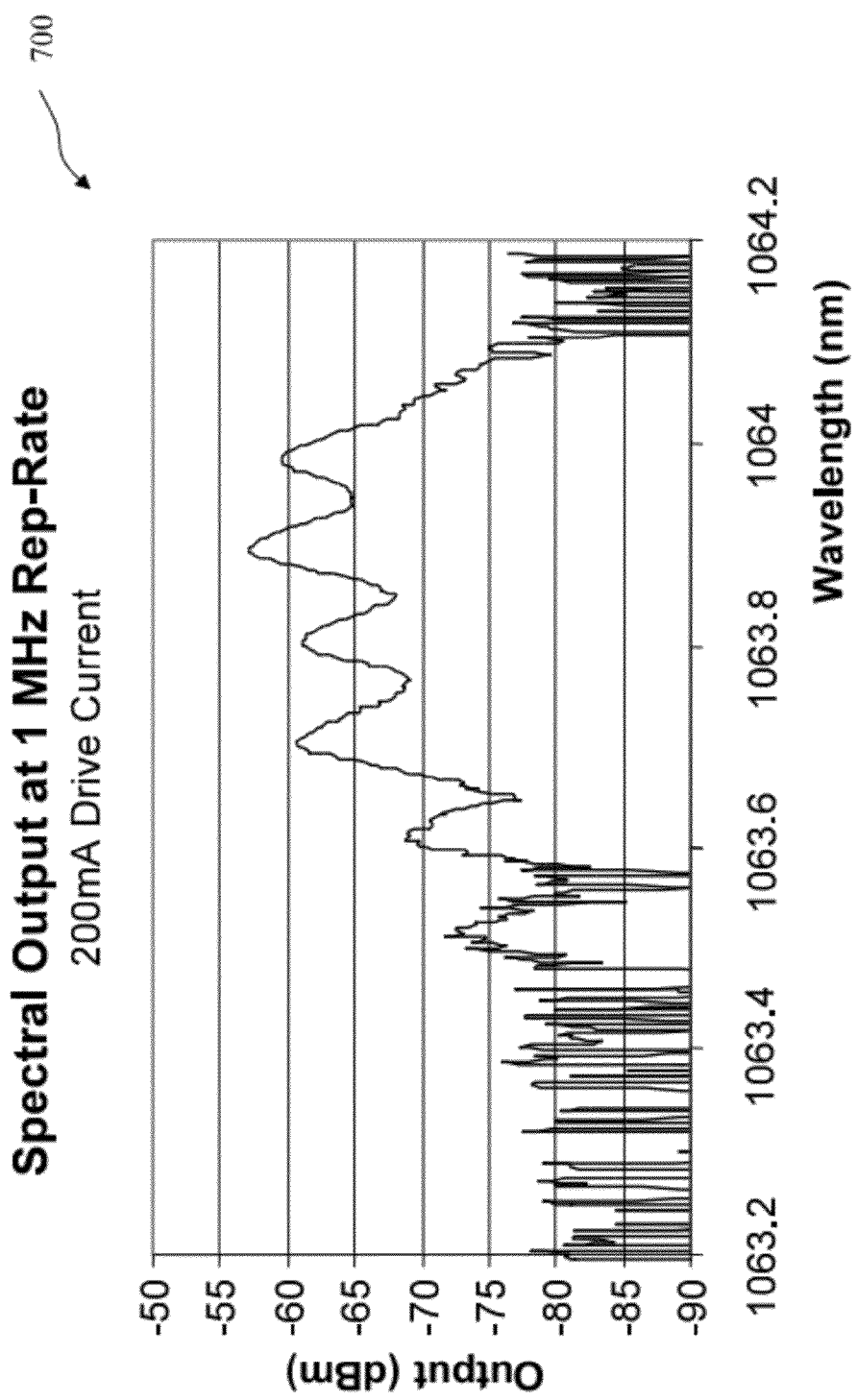
FIG. 7 is a graph of the output wavelength of the Sacher Diode operating in pulsed mode with 200 mA peak drive current.
Figure 8:
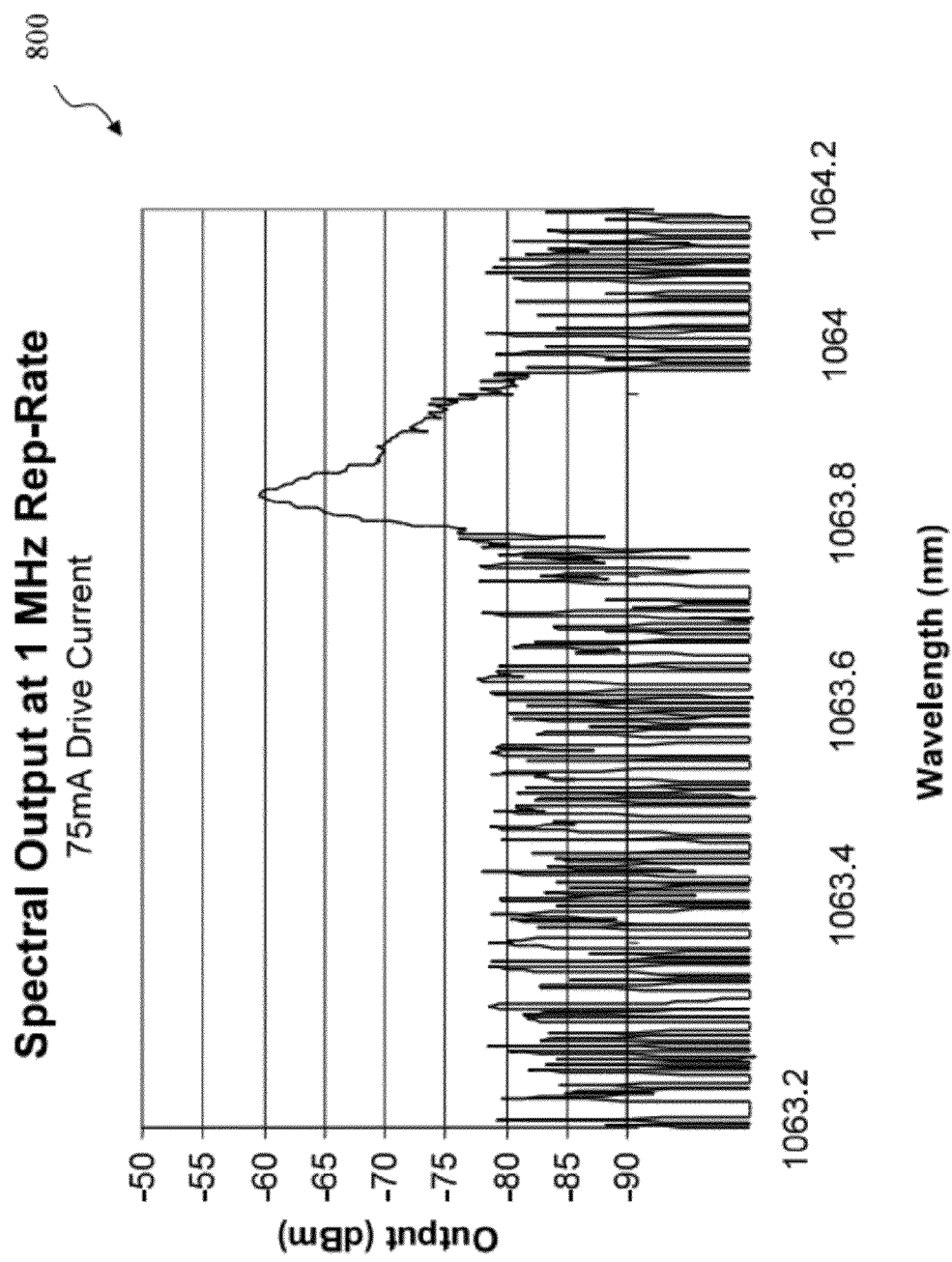
FIG. 8 is a graph of the output wavelength of the Sacher Diode operating in pulsed mode with the peak drive current set at 75 mA.

FIG. 7 shows the output wavelength of the Sacher diode operating in pulsed mode with 200 mA peak drive current. Multiple longitudinal modes are present in the OSA data.

FIG. 8 shows the output wavelength of the Sacher diode operating in pulsed mode with the peak drive current set at 75 mA. Under certain conditions, the output could be limited to a single longitudinal mode with >20 dB side mode suppression.

Figure 9:
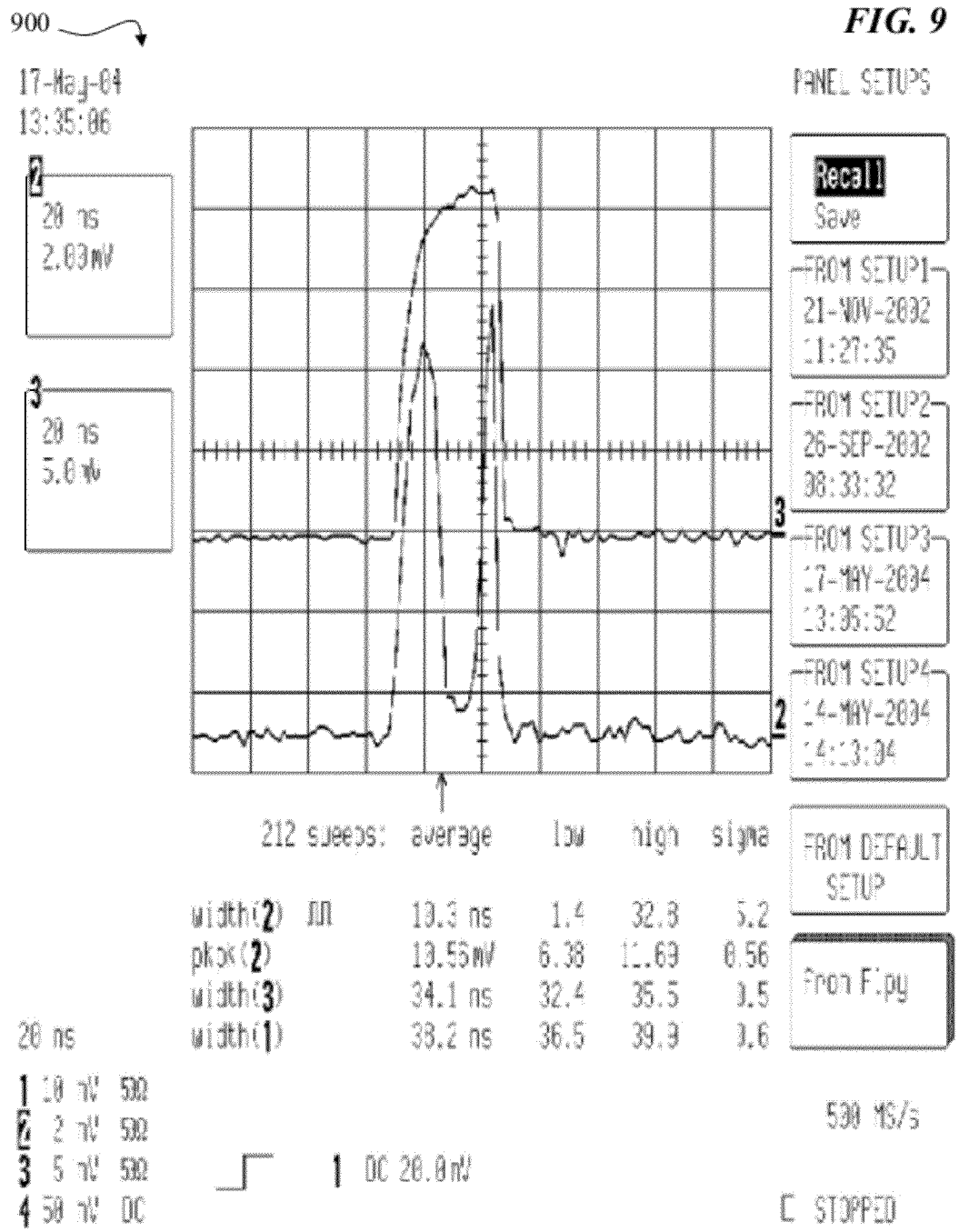
FIG. 9 is a graph of the photodiode signals for the power monitor and the wavelength monitor after transmission through an etalon. The graph indicates that the laser diode is operating at one wavelength for the first approximately 5 ns, then jumps briefly to a second wavelength that is not transmitted, and then to a third wavelength that is transmitted.

The presence of additional modes was also visible in other data. FIG. 9 shows the photodiode signal for the photodiode monitoring the total optical signal and the wavelength monitor photodiode measuring the transmitted power through the etalon. The bandwidth of the etalon used in the wavelength monitor in this example is 5.9 GHz. It appears that the laser diode operated in one mode for the first approximately 5 ns of the pulse, then jumped to a second wavelength that was not transmitted by the etalon. After that jump the wavelength either jumped back to the original nominal wavelength or to a third wavelength that happened to be transmitted by the etalon. This behavior was discovered to be associated with OSA spectra that showed multiple modes (similar to FIG. 7) with limited side mode suppression.

FIG. 9 shows photodiode signals for the power monitor (Ch 3) and the wavelength monitor (Ch 2) after transmission through the second etalon. The etalon is tuned to the maximum transmission but the temporal signal indicates that the laser diode is operating at one wavelength for the first approximately 5 ns, then jumps briefly to a second wavelength that is not transmitted, and then to a third wavelength that is transmitted. This behavior was correlated with OSA spectra that showed multiple modes in the spectra with limited side mode suppression.

Figure 10:
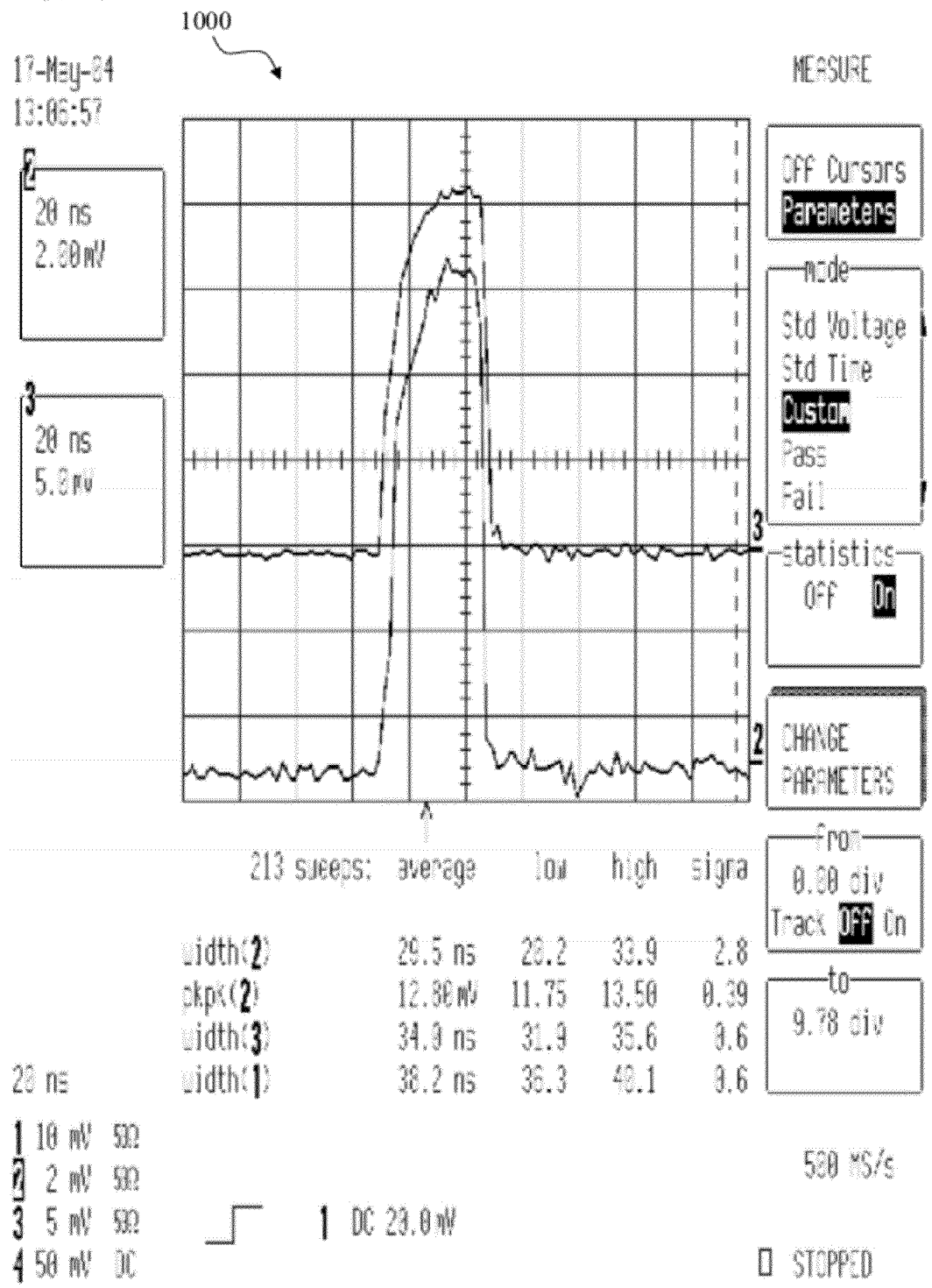
FIG. 10 is a graph of photodiode signals for the power monitor and the wavelength monitor after transmission through an etalon.

By adjusting the pulsed current to the gain section and the CW current to the DBR section, the side mode suppression could be improved and the photodiode signals shown in FIG. 10 could be obtained. Here the power and wavelength monitor diodes show similar pulse shapes, and no sign of mode hopping. The difference in the DBR current between the two data sets was only 1.8 mA.

FIG. 10 shows photodiode signals for the power monitor (Ch 3) and the wavelength monitor (Ch 2) after transmission through the second etalon. The etalon is tuned to the maximum transmission for this data.

With the same conditions as those shown in FIG. 10, the linewidth was measured to be 875 MHz. This is the average of the four peak widths shown in FIG. 11.

Figure 11:
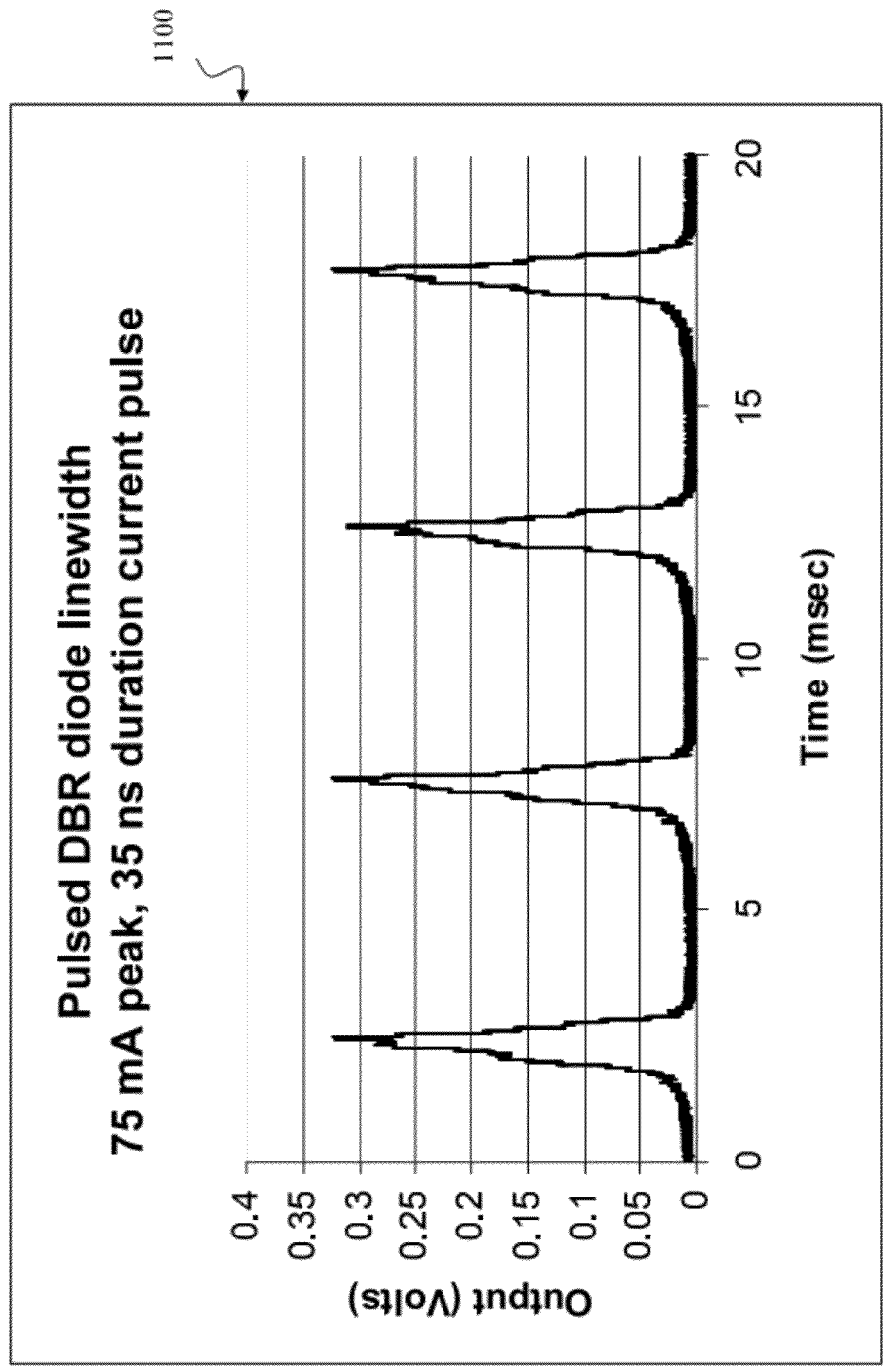
FIG. 11 is a graph of the scanning Fabry-Perot Signal for the Sacher Diode operating in pulsed mode with the peak drive current set at 75 mA and a pulse duration of 35 ns.

FIG. 11 shows a scanning Fabry-Perot signal for the Sacher diode operating in pulsed mode with the peak drive current set at 75 mA and a pulse duration of 35 ns. The average linewidth for the four peaks is 875 MHz.

Tunable Linewidth Seed Source Setup

Since the linewidth of the seed source under simple pulsed operation was still too large for the specification, a slightly more complicated setup was developed to generate pulsed output that provided variable linewidth. The setup still used the chirp of the diode during a pulse, but used an acousto-optic modulator after the diode to select a time window. Since the diode chirps most rapidly at the beginning of the pulse, the diode could be pulsed for approximately 350-400 ns and the AOM could be timed to "slice" a 100-ns pulse at different delay times to capture more or less of the diode chirp.

FIG. 12 is described above.

Figure 13:
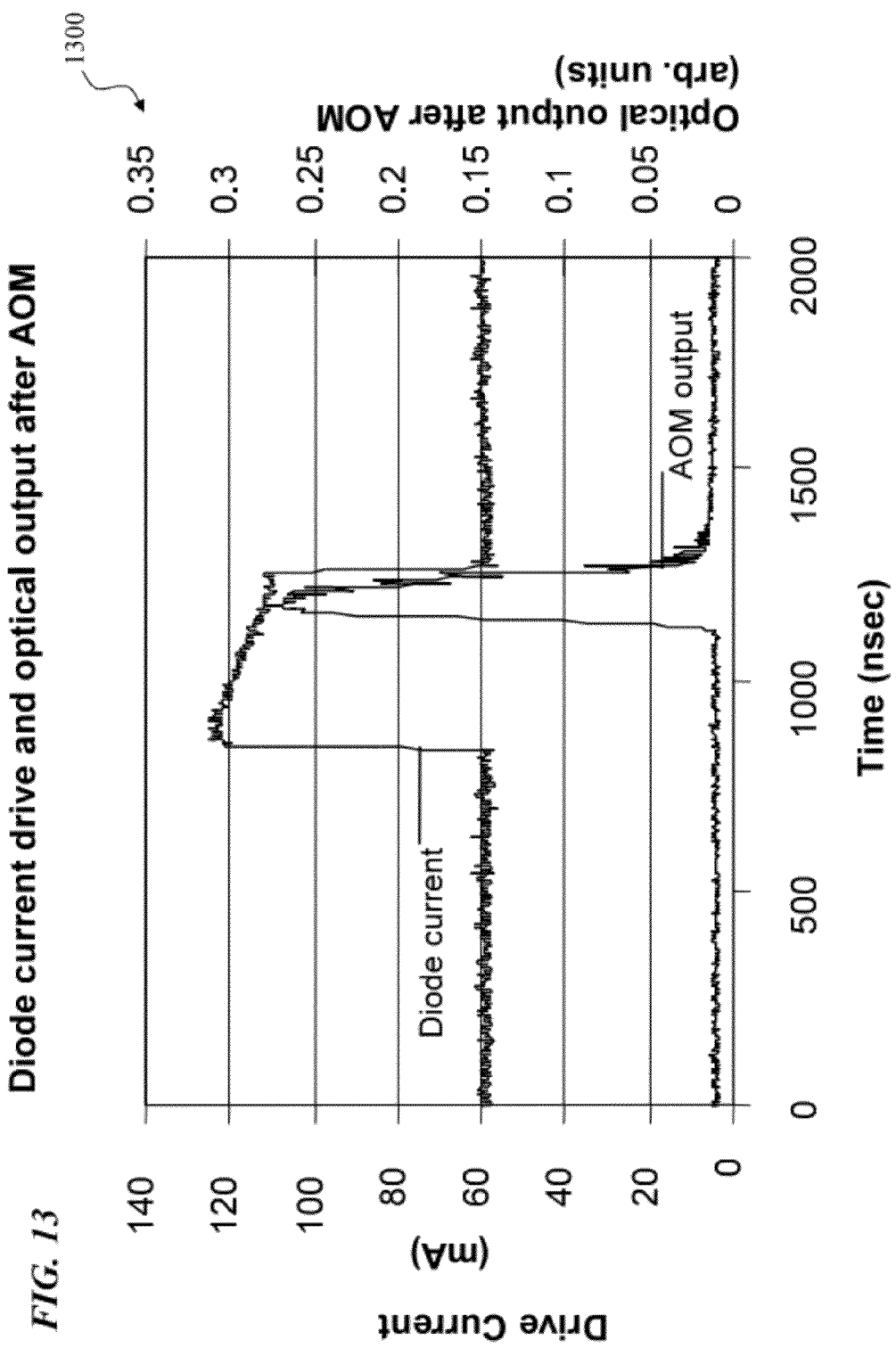
FIG. 13 is a graph of diode drive current and relative timing of the AOM.

FIG. 13 shows diode drive current and relative timing of the AOM. The diode current has a CW component to avoid mode hops, and a pulsed component to provide a controlled amount of diode chirp. By timing the AOM pulse to slice an approximately 100-ns section of the diode output, a selection may be made of either the rapid chirp at the beginning of the diode pulse to produce a large linewidth, or a relatively small chirp at the end of the diode pulse for narrower linewidth.

Figure 14:
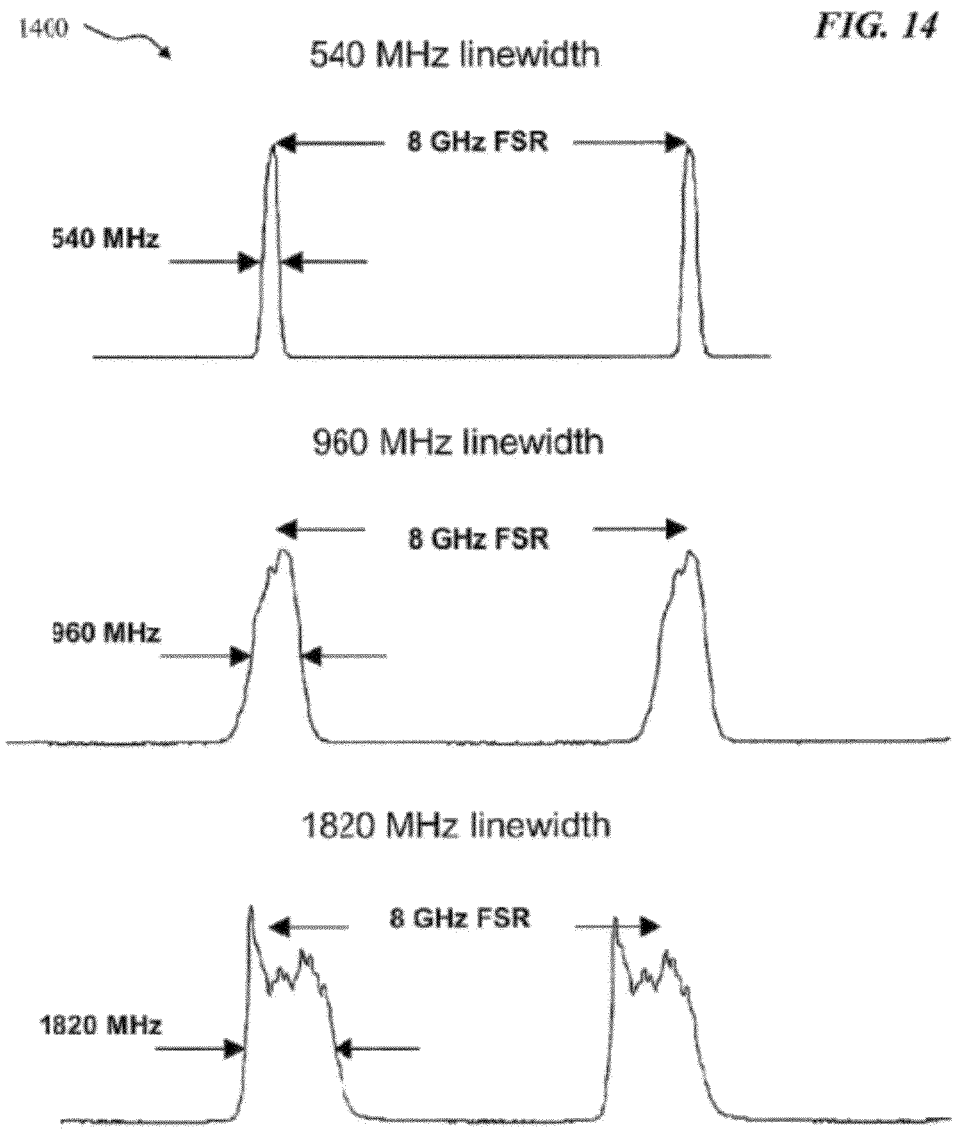
FIG. 14 is a set of graphs which resulted from scanning Fabry-Perot traces of the seed source linewidth for various AOM delays.

FIG. 14 shows scanning Fabry-Perot traces of the seed source linewidth for various AOM delays.

Figure 15:
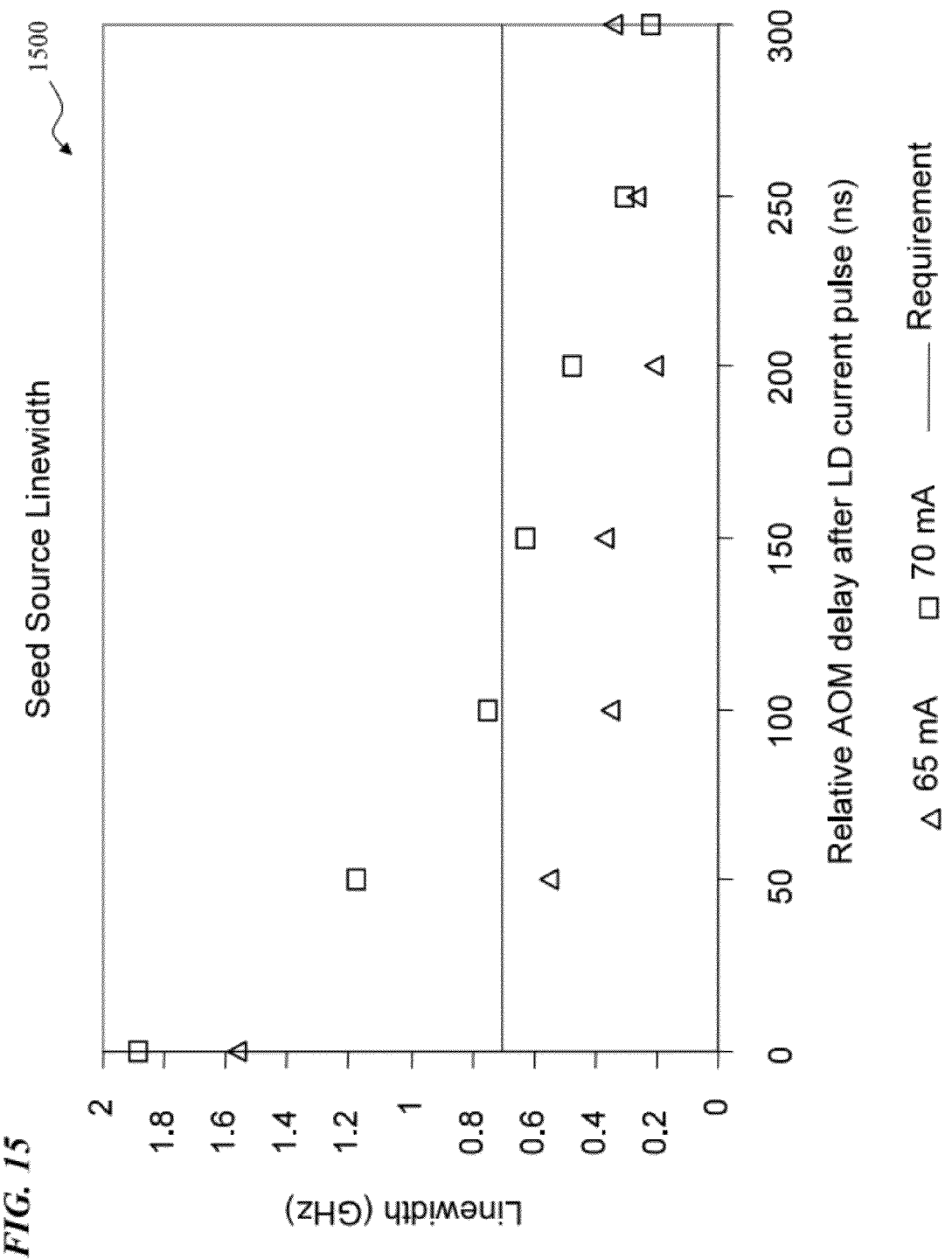
FIG. 15 is a graph of seed source linewidth as a function of the AOM delay after the laser diode current pulse.

FIG. 15 shows Seed source linewidth as a function of the AOM delay after the laser diode current pulse. By optimizing the CW and pulsed diode drive currents, along with the relative AOM delay, the linewidth can be programmed from approximately 200 to 2000 MHz.

Apparatus and Method for Generating Temporally Shaped Laser-Seed-Signals for High-Powered Fiber-Laser Amplifier Systems Some Limitations of Conventional Systems:

1. When a pulsed laser source is amplified the leading edge of the pulse is typically amplified to a greater extent than the trailing edge of the pulse. This is because the inversion, and therefore the gain, is higher before energy is extracted from the gain medium (when a gain medium is pumped to a high-level of inversion, the initial light is highly amplified, however as the inversion energy is extracted and the laser intensity increases, there is a lower level of inversion and this results in less gain (later in time) to the laser output). This effect has dramatic results when using rare-earth doped optical fibers to amplify a pulsed signal. (In a typical fiber amplifier the unextracted gain is very high, and the gain variation during the pulse can be very substantial.) A solution involves pre-distorting the pulse shape to compensate for the gain variation during the pulse.

2. When a diode laser is turned on a very narrow gain-switched spike is present at the leading edge of the laser pulse. (Such gain-switched spikes are well-known in a wide variety of laser systems. They happen when the gain is suddenly driven well above threshold, but there is little light available to extract the gain. The light field can then build up very rapidly, and produce an output spike before equilibrium between the pumping and extraction of the gain medium is established.) If amplified in a subsequent amplifier stage(s), the gain-switched spike can cause optical damage in the laser system, and potentially cause poor performance of the laser for its intended use. A solution involves tailoring the current drive to the diode laser to minimize the creation of the gain-switched spike.

3. For pulses of duration longer than several nanoseconds (say, longer than about 5-10 ns), SBS (stimulated Brillouin scattering) limits the available peak power or energy available from pulsed fiber amplifier systems with narrow-linewidth seed laser sources. A solution involves making the optical frequency of the seed diode "chirp" (that is, slew rapidly) during the pulse.

4. In some applications, the shape, and not just the energy or duration of a laser pulse, has significant influence on the effects of the laser pulse. For example, in materials processing, it may be desirable to generate a temporally flat-topped pulse rather than a sharply-peaked pulse, to avoid damage to a substrate from excessive peak power. Simply driving the laser diode with a square or Gaussian-like pulse does not allow tailoring of the pulse shape.

In some embodiments of this invention, the drive current to the diode-laser seed source is controlled such that the optical pulse from the diode laser has an optimal shape for amplification in subsequent fiber amplifier stage(s). It is also possible to tailor the shape of the input optical pulse to the fiber amplifier stages(s) to produce an output pulse whose shape is most desirable for subsequent uses, for example, for materials processing. The invention includes the approach of pre-distorting the pulse to achieve the desired output pulse shape, tailoring the pulse shape for desired applications, techniques for suppressing gain-switched spikes, and ramping the laser diode to generate frequency chirp for SBS suppression.

In some embodiments, this is done by electronically controlling the shape of the drive current pulse applied to the seed laser diode in a diode laser-fiber amplifier system. In some embodiments, the laser diode drive circuit sums several current sources that can be switched on together, or switched on sequentially with time delays between. Additionally, the current sources can produce a fixed current when turned on, or in some cases a changing value. Because the gain of the fiber amplifier decreases as it is extracted during a pulse, it is often desirable for the seed source intensity to increase with time. Consequently, this design is capable of summing in one or more increasing ramp waveforms, whose slope and amplitude can be flexibly defined.

FIG. 16A is a simplified schematic of a pulsed current source 1600 that generates a very fast current pulse, where the current magnitude varies as a function of time, increasing the current later in the pulse to compensate for the reduction in gain over time in a fiber gain medium. In some embodiments, current source 1600 includes a plurality of current sources 1610, 1620, ... 1630, each supplied from a different magnitude voltage source V1, V2, ... Vn, and each switched on at a successively longer delay, in order to increase the magnitude of the current pulse into laser diode 1640 over time. Shorting switch 1650 ends the current pulse into the laser diode 1640 after a suitable time delay $t_s$, in some embodiments. Current source 1610 operates from voltage V1 1611, which flows through resistor 1613 once switch S1 1614 closes after a delay $\Delta t_1$, from start RAMP trigger 1605 (RAMP). Current source 1620 operates from voltage V2 1621, which flows through resistor 1623 once switch S2 1624 closes after a delay $\Delta t_2$, from start RAMP trigger 1605 (RAMP). Current source 1630 operates from voltage V1 1631, which flows through resistor 1633 once switch Sn 1634 closes after a delay $\Delta t_n$, from start RAMP trigger 1605 (RAMP).

FIG. 16B (which includes 16B1 and 16B2 and 16B3) includes a detailed schematic of one embodiment of pulsed current source 1600 that generates a very fast current pulse, where the current magnitude varies as a function of time, increasing the current later in the pulse to compensate for the reduction in gain over time in a fiber gain medium. An external trigger source is applied simultaneously to multiple elements of the circuit. Each element (designated by the index n) includes a time delay $\Delta t_n$, after which an electronic switch $S_n$ closes. The switches $S_n$ apply the various voltage sources $V_n$ to circuit elements $L_n$ (inductors) or $R_n$ (resistors). The currents passing through elements $L_n$ and $R_n$ are combined and are applied to the laser diode. Since it is desirable for many applications to achieve a rapid fall-time at the end of the laser pulse, an additional electronic switch is provided to rapidly shunt the applied current to ground, terminating the current flowing through the laser diode. FIG. 16B3 is a simplified block diagram of one such component circuit element 1601 that includes a circuit including series connected voltage source V1, switch 51, inductor L2 and a load.

The circuit provides great flexibility in the output waveform, since the applied voltage, time delay, and series inductance or resistance for each of several circuit elements can be varied independently.

In some embodiments, fiber amplifiers driven by a pulsed laser seed source having a "square" pulse (a pulse that has substantially constant amplitude) will deplete their stored energy during the period of the pulse, thereby outputting an output pulse that has more power (i.e., amplitude) at the beginning of the pulse (when the fiber amplifier has the most stored energy from the optical pump laser being converted to the output wavelength) and less power towards the end of the pulse when the energy has been depleted by amplifying earlier portions of the pulse. This results in an output pulse that is "steeper" than the input pulse. In some embodiments, in order to compensate for pulse steepening effects in the fiber amplifier, the temporal shape of the input pulse is modified. In some embodiments, the input pulse has an amplitude that has a rising slope, with the slope adjusted to the energy-depletion curve of the fiber amplifier, in order to obtain an output pulse having a desired shape (e.g., in some embodiments, an output pulse having a more-constant amplitude). Typically a rising-slope waveform is used to compensate for decreasing fiber amplifier gain over the duration of a pulse.

In some embodiments, to minimize the gain-switched spike, prior to producing the desired pulse output, the diode laser drive current is turned on to a level slightly below the lasing threshold, or else ramped up slowly. By using either the sub-threshold excitation or the slow ramp, the radiation field in the diode laser is established, minimizing or eliminating the gain-switched spike when the main current pulse is applied to produce an optical pulse.

In cases where it is necessary to suppress SBS (for example, for pulse lengths longer than about 5-10 ns) ramping the drive current causes the diode to frequency chirp. This increases the effective spectral linewidth of the source, or, equivalently, decreases the dwell time at any specific wavelength, thwarting the build-up of SBS. This effect is particularly useful with DFB (distributed feedback) or DBR (distributed Bragg reflector) diodes, which are inherently narrowband devices. The DFB and DBR devices exhibit significant frequency chirp as their drive current is ramped during a pulse.

A further benefit of pre-shaping the seed diode pulse is to allow generation of pulse shapes optimized for a particular process, for example, materials processing. By using a diode laser-fiber amplifier system with a flexible pulse-shaping apparatus, the performance for a particular application can be optimized by adjusting the pulse shape. For example, Smart describes the usefulness of pulse shaping in U.S. Pat. No. 6,281,471 (which is incorporated herein by reference). However, this disclosure specifically describes generating the ultimately desired pulse shape by modulating the seed laser, then amplifying the desired pulse shape in a nondistorting amplifier. Our invention recognizes that distortion in fiber amplifiers is very common, and it is much more practical to pre-compensate for these distortions with the versatile circuit described here.

Figure 17:
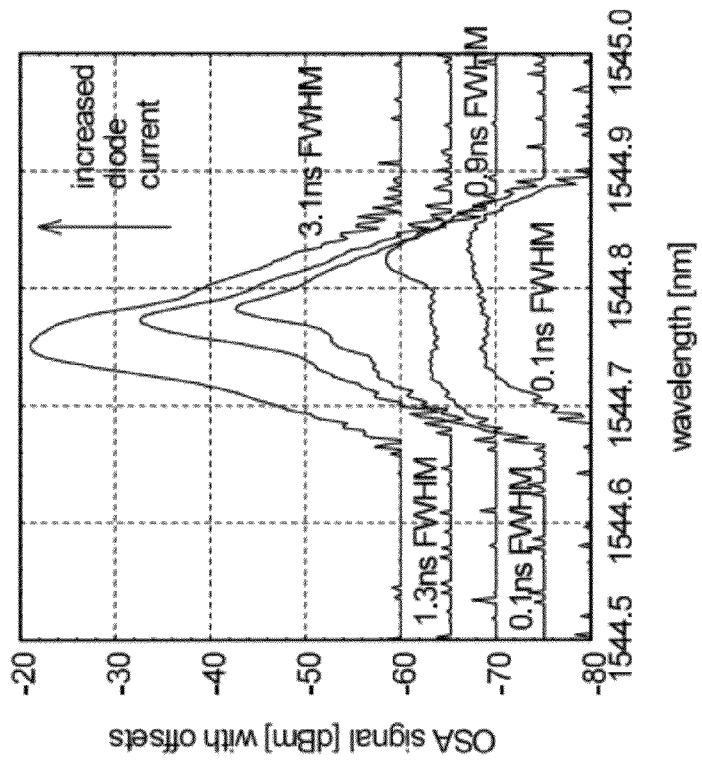
FIG. 17 is a graph of the spectral trace of a seed-source laser driven by each of the five pulses of FIG. 16C.
Figure 16C:
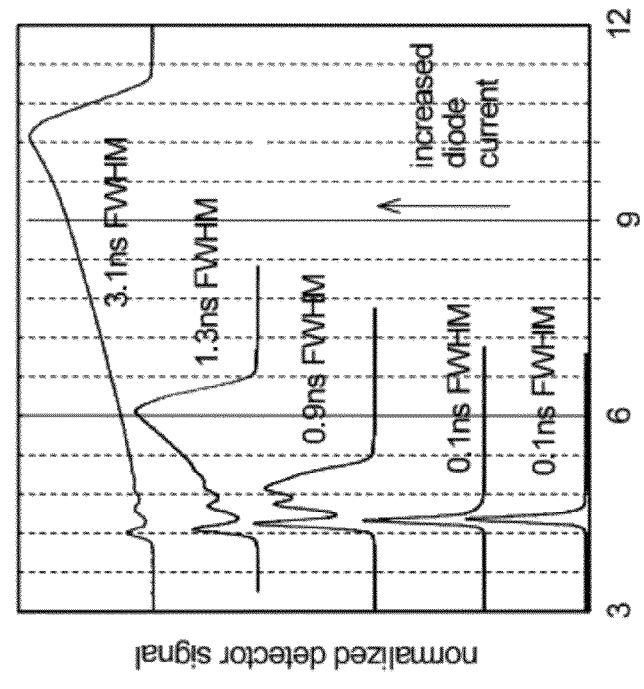
FIG. 16C is a graph of the shape of a shaped laser diode current pulse for a seed source as a function of time, for five different pulse types and current magnitudes.
Figure 18:
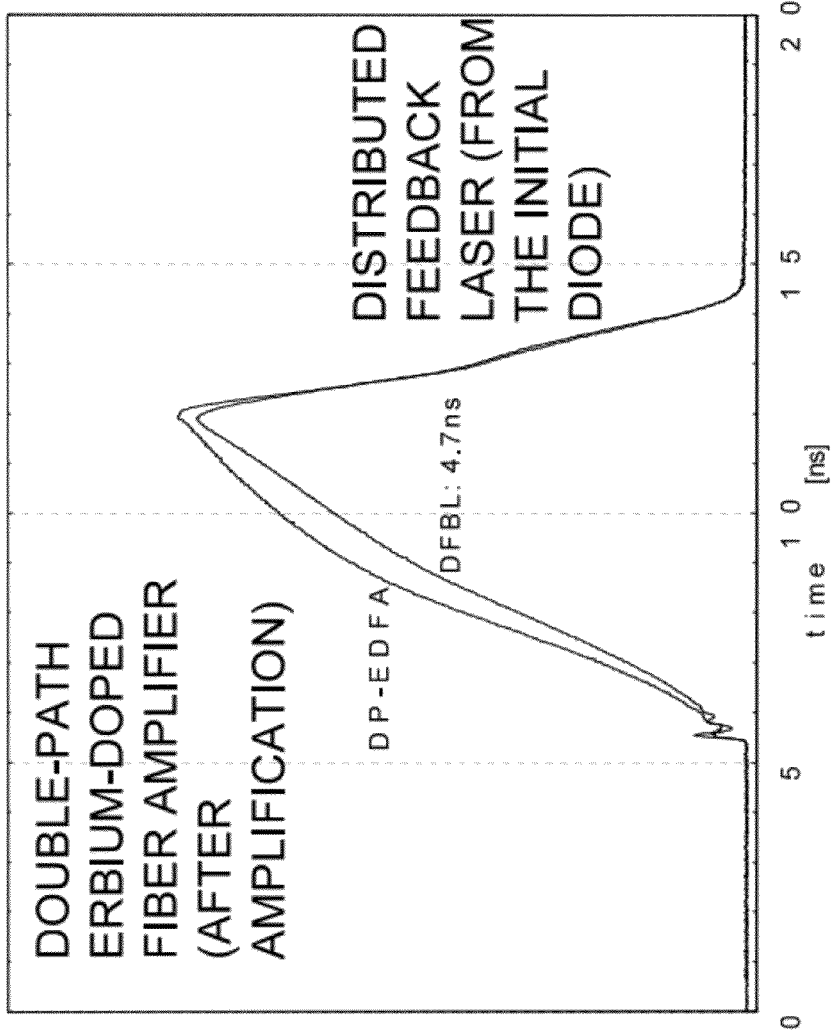
FIG. 18 is a graph of gain-switched spike as a function of time.

FIG. 16C is a graph of the shape of a shaped laser diode current pulse for a seed source as a function of time, for five different pulse types and current magnitudes. FIG. 17 is a graph of the spectral trace of a seed-source laser driven by each of the five pulses of FIG. 16. FIG. 18 is a graph of the laser diode optical output as a function of time when driven by a current pulse which increases with time, and the optical output after passing through a fiber amplifier.

Figure 19:
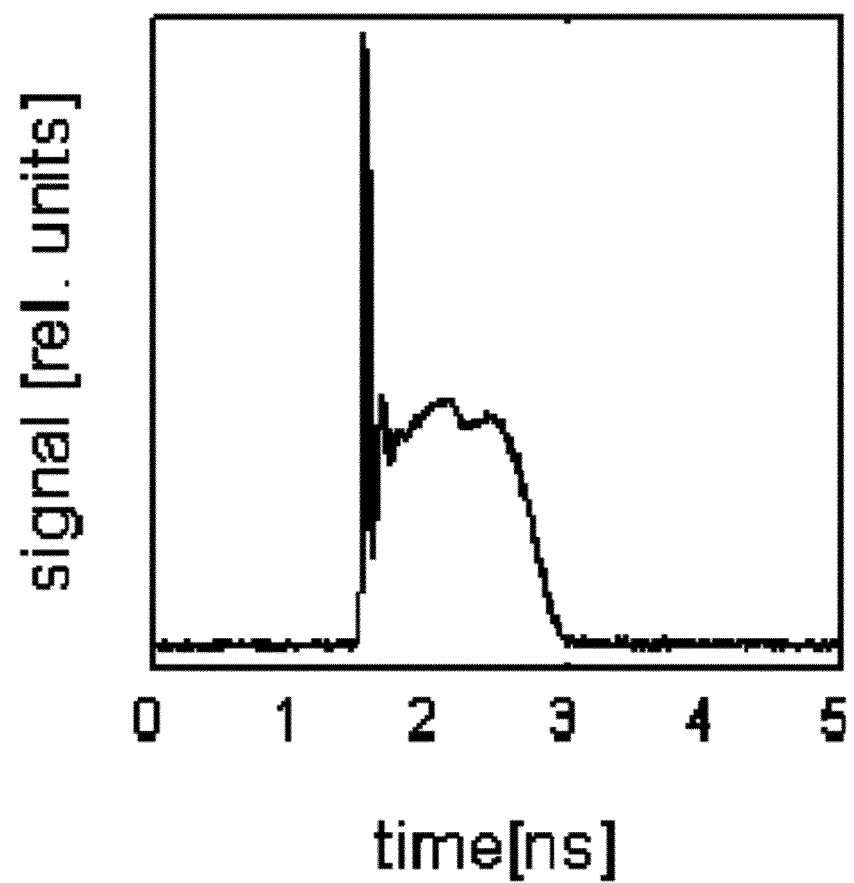
FIG. 19 is a graph of the shape of a shaped laser pulse for a SOA+DFB seed source as a function of time.

FIG. 19 is a graph of the shape of a laser pulse generated with a driver typical of the prior art. It shows a prominent gain-switched spike at its start.

Some embodiments of the present invention include a filtered ASE source coupled to a fiber laser amplifier for applications where the linewidth must be greater than about 0.01 nm and controlled to be a fixed value that does not vary with laser properties, and having a linewidth less than about 10 nm.

Some embodiments of the present invention include a filtered ASE source for a polarization maintaining (PM) fiber laser amplifier.

Some embodiments of the present invention include a filtered ASE source for an LMA fiber laser amplifier.

Some embodiments of the present invention include a filtered ASE source for a PM LMA fiber laser amplifier.

Some embodiments of the present invention include a filtered ASE source followed by modulator as seed source for a fiber amplifier with pulsed output.

Some embodiments of the present invention include a filtered ASE source followed by modulator as seed source for a PM fiber amplifier with pulsed output.

Some embodiments of the present invention include a filtered ASE source followed by modulator as seed source for an LMA fiber amplifier with pulsed output.

Some embodiments of the present invention include a filtered ASE source followed by modulator as seed source for a PM LMA fiber amplifier with pulsed output.

Some embodiments of the present invention include a chirped laser diode as seed source for fiber laser amplifier.

Some embodiments of the present invention include a chirped single longitudinal mode laser diode as a seed source for a fiber laser amplifier.

Some embodiments of the present invention include a chirped single longitudinal mode laser diode as a seed source for a PM fiber laser amplifier.

Some embodiments of the present invention include a chirped single longitudinal mode laser diode as a seed source for an LMA fiber laser amplifier.

Some embodiments of the present invention include a chirped single longitudinal mode laser diode as a seed source for a PM LMA fiber laser amplifier.

Some embodiments of the present invention include an optical seed source for fiber laser amplifiers where the linewidth is determined by a wavelength-dependent filter for applications where the linewidth must be greater than about 0.01 nm to avoid Stimulated Brillouin Scattering.

Some embodiments of the present invention include an optical seed source for fiber laser amplifiers where the linewidth is determined by a wavelength dependent filter for applications where the linewidth must be greater than about 0.01 nm to avoid Stimulated Brillouin Scattering and less than about 1 nm to be within the spectral acceptance of a nonlinear optical crystal.

Some embodiments of the present invention include an optical seed source for fiber laser amplifiers where the linewidth is determined by an FBG for applications where the linewidth must be greater than about 0.01 nm to avoid Stimulated Brillouin Scattering.

Some embodiments of the present invention include an optical seed source for fiber laser amplifiers where the linewidth is determined by an FBG for applications where the linewidth must be greater than about 0.01 nm to avoid Stimulated Brillouin Scattering and less than about 1 nm to be within the spectral acceptance of a nonlinear optical crystal.

Some embodiments of the present invention include an optical seed source for fiber laser amplifiers where the linewidth is determined by a wavelength dependent filter for applications where the linewidth must be greater than about 0.01 nm to avoid Stimulated Brillouin Scattering and the amplifier is substantially polarization-maintaining.

Some embodiments of the present invention include an optical seed source for fiber laser amplifiers where the linewidth is determined by a wavelength dependent filter for applications where the linewidth must be greater than about 0.01 nm to avoid Stimulated Brillouin Scattering and less than about 1 nm to be within the spectral acceptance of a nonlinear optical crystal and the amplifier is substantially polarization-maintaining.

Some embodiments of the present invention include an optical seed source for fiber laser amplifiers where the linewidth is determined by an FBG for applications where the linewidth must be greater than about 0.01 nm to avoid Stimulated Brillouin Scattering and the amplifier is substantially polarization-maintaining.

Some embodiments of the present invention include an optical seed source for fiber laser amplifiers where the linewidth is determined by an FBG for applications where the linewidth must be greater than about 0.01 nm to avoid Stimulated Brillouin Scattering and less than about 1 nm to be within the spectral acceptance of a nonlinear optical crystal and the amplifier is substantially polarization-maintaining.

Some embodiments of the present invention include an optical seed source for fiber laser amplifiers where the linewidth is determined by a wavelength dependent filter for applications where the linewidth must be greater than about 0.01 nm to avoid Stimulated Brillouin Scattering, followed by a modulator, as seed source for fiber amplifier with pulsed output.

Some embodiments of the present invention include an optical seed source for fiber laser amplifiers where the linewidth is determined by a wavelength dependent filter for applications where the linewidth must be greater than about 0.01 nm to avoid Stimulated Brillouin Scattering and less than about 1 nm to be within the spectral acceptance of a nonlinear optical crystal, followed by a modulator, as seed source for fiber amplifier with pulsed output.

Some embodiments of the present invention include an optical seed source for fiber laser amplifiers where the linewidth is determined by an FBG for applications where the linewidth must be greater than about 0.01 nm to avoid Stimulated Brillouin Scattering, followed by a modulator, as seed source for fiber amplifier with pulsed output.

Some embodiments of the present invention include an optical seed source for fiber laser amplifiers where the linewidth is determined by an FBG for applications where the linewidth must be greater than about 0.01 nm to avoid Stimulated Brillouin Scattering and less than about 1 nm to be within the spectral acceptance of a nonlinear optical crystal, followed by a modulator, as seed source for fiber amplifier with pulsed output.

Some embodiments of the present invention include an optical seed source for fiber laser amplifiers where the linewidth is determined by a wavelength dependent filter for applications where the linewidth must be greater than about 0.01 nm to avoid Stimulated Brillouin Scattering, followed by a modulator, as seed source for fiber amplifier with pulsed output where the amplifier is substantially polarization-maintaining.

Some embodiments of the present invention include an optical seed source for fiber laser amplifiers where the linewidth is determined by a wavelength dependent filter for applications where the linewidth must be greater than about 0.01 nm to avoid Stimulated Brillouin Scattering and less than about 1 nm to be within the spectral acceptance of a nonlinear optical crystal, followed by a modulator, as seed source for fiber amplifier with pulsed output where the amplifier is substantially polarization-maintaining.

Some embodiments of the present invention include an optical seed source for fiber laser amplifiers where the linewidth is determined by an FBG for applications where the linewidth must be greater than about 0.01 nm to avoid Stimulated Brillouin Scattering, followed by a modulator, as seed source for fiber amplifier with pulsed output where the amplifier is substantially polarization-maintaining.

Some embodiments of the present invention include an optical seed source for fiber laser amplifiers where the linewidth is determined by an FBG for applications where the linewidth must be greater than about 0.01 nm to avoid Stimulated Brillouin Scattering and less than about 1 nm to be within the spectral acceptance of a nonlinear optical crystal, followed by a modulator, as seed source for fiber amplifier with pulsed output where the amplifier is substantially polarization-maintaining.

Some embodiments of the present invention include a filtered ASE source followed by modulator as seed source for LMA fiber amplifier with pulsed output.

Some embodiments of the present invention include a filtered ASE source followed by modulator as seed source for PM LMA fiber amplifier with pulsed output.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-En-

What is claimed is:

1. An apparatus comprising:
an optical fiber gain medium having optical gain;
an optical pump source operatively coupled to the optical fiber gain medium to deliver optical pump energy that is stored in the optical fiber gain medium and builds up over time;
a laser-diode pulsed seed source operatively coupled to the optical fiber gain medium, wherein the laser-diode pulsed seed source provides an optical-seed-laser signal to the optical fiber gain medium to be amplified by the optical fiber gain medium and wherein the optical-seed-laser signal has an amplitude that varies over time and that includes laser pulses; and
a pulsed electrical-current source operatively coupled to supply pulsed laser drive current to the laser-diode pulsed seed source, wherein a magnitude of the laser drive current is controlled to suppress gain-switched spikes in the amplitude of the laser pulses.

2. The apparatus of claim 1, wherein the electrical-current source is controlled to supply current at a level that heats the laser-diode pulsed seed source, but wherein the level is below a lasing-threshold amount of current prior to producing the pulsed laser drive current.

3. The apparatus of claim 1, wherein the electrical-current source supplies the pulsed laser drive current with an increasing-ramp shape.

4. The apparatus of claim 1, wherein the electrical-current source limits the pulsed laser drive current such that mode hopping is avoided.

5. The apparatus of claim 1, wherein the electrical-current source is controlled to supply a continuous-wave (CW) bias current amount at a level as high as possible without exceeding lasing threshold prior to producing the pulsed laser drive current.

6. The apparatus of claim 1, wherein the apparatus is configured to control the pulsed electrical-current source to supply bias current to the laser-diode pulsed seed source to heat the laser-diode pulsed seed source between pulses of the pulsed laser drive current to suppress mode hopping.

7. The apparatus of claim 1, wherein the apparatus is configured to control the pulsed electrical-current source to adjust a level of the pulsed drive current until mode hopping is observed, and to then reduce the pulsed drive current level to a value still greater than a lasing-threshold amount of current.

8. A method comprising:
providing an optical fiber gain medium having optical gain;
providing an optical-pump source operatively coupled to the optical fiber gain medium to deliver optical pump energy that is stored in the optical fiber gain medium and builds up over time;
providing a laser-diode pulsed seed source;
connecting an optical-seed-laser signal from the laser-diode pulsed seed source to the optical fiber gain medium, wherein the optical-seed-laser signal has an amplitude that varies over time and that includes laser pulses;
amplifying the optical-seed-laser signal by the optical fiber gain medium;
supplying pulsed laser drive current to the laser-diode pulsed seed source; and
controlling a magnitude of the laser drive current to suppress gain-switched spikes in the amplitude of the laser pulses.

9. The method of claim 8, wherein the controlling a magnitude of the laser drive current includes controlling the current at a level that heats the laser-diode pulsed seed source, but wherein the level is below a lasing-threshold amount of current prior to producing the pulsed laser drive current.

10. The method of claim 8, wherein the controlling a magnitude of the laser drive current includes supplying the pulsed laser drive current with an increasing-ramp shape.

11. The method of claim 8, wherein the controlling a magnitude of the laser drive current includes limiting the pulsed laser drive current such that mode hopping is avoided.

12. The method of claim 8, wherein the controlling a magnitude of the laser drive current includes supplying a continuous-wave (CW) bias current amount at a level as high as possible without exceeding lasing threshold prior to producing the pulsed laser drive current.

13. The method of claim 8, further comprising heating the laser-diode seed source between pulses to suppress mode hopping.

14. The method of claim 8, further comprising:
adjusting a level of the pulsed drive current until mode hopping is observed; and
reducing the pulsed drive current level to a value below the level of mode hopping still greater than a lasing-threshold amount of current.

15. An apparatus comprising:
an optical fiber gain medium having optical gain;
an optical-pump source operatively coupled to the optical fiber gain medium, wherein the optical-pump source is configured to deliver optical-pump energy from the optical-pump source to the optical fiber gain medium, and wherein the delivered optical-pump energy is stored in the optical fiber gain medium and builds up over time;
a laser-diode pulsed seed source configured to emit an optical-seed-laser signal, wherein the optical-seed-laser signal has an amplitude that varies over time and that includes laser pulses;
means for supplying pulsed laser drive current to the laser-diode pulsed seed source; and
means for controlling a magnitude of the laser drive current to suppress gain-switched spikes in the amplitude of the laser pulses.

16. The apparatus of claim 15, wherein the means for controlling a magnitude of the laser drive current includes means for controlling the current at a level that heats the laser-diode pulsed seed source, but wherein the level is below a lasing-threshold amount of current prior to producing the pulsed laser drive current.

17. The apparatus of claim 15, wherein the means for controlling a magnitude of the laser drive current includes means for supplying the pulsed laser drive current with an increasing-ramp shape.

18. The apparatus of claim 15, wherein the means for controlling a magnitude of the laser drive current includes means for limiting the pulsed laser drive current such that mode hopping is avoided.

19. The apparatus of claim 15, wherein the means for controlling a magnitude of the laser drive current includes means for supplying a continuous-wave (CW) bias current amount at a level as high as possible without exceeding lasing threshold prior to producing the pulsed laser drive current.

20. The apparatus of claim 15, further comprising:
means for heating the laser-diode seed source between pulses to suppress mode hopping.

* * * * *